US012144428B1

(12) United States Patent
Flannery

(10) Patent No.: US 12,144,428 B1
(45) **Date of Patent: *Nov. 19, 2024**

(54) HIDE AWAY BED RAIL

(71) Applicant: Regalo International, LLC, Burnsville, MN (US)

(72) Inventor: Mark A. Flannery, Longboat Key, FL (US)

(73) Assignee: Regalo International, LLC, Longboat Key, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,553

(22) Filed: Jun. 4, 2023

Related U.S. Application Data

(63) Continuation of application No. 17/198,221, filed on Mar. 10, 2021, now Pat. No. 11,666,154, which is a continuation of application No. 16/847,614, filed on Apr. 13, 2020, now Pat. No. 10,945,532, which is a continuation of application No. 15/632,372, filed on Jun. 25, 2017, now Pat. No. 10,617,222, which is a continuation of application No. 14/846,821, filed on (Continued)

(51) Int. Cl.
*A47C 21/08* (2006.01)
*A61G 7/05* (2006.01)

(52) U.S. Cl.
CPC ................ *A47C 21/08* (2013.01); *A61G 7/05* (2013.01); *A61G 7/0507* (2013.01); *A61G 7/051* (2016.11); *A61G 7/0518* (2016.11)

(58) Field of Classification Search
CPC .... A47C 21/08; A61G 7/0507; A61G 7/0508; A61G 7/0509; A61G 7/051; A61G 7/0512; A61G 7/0513; A61G 7/0514; A61G 7/0515; A61G 7/0516; A61G 7/0518; A61G 7/0519; A61G 7/052; A61G 7/0521; A61G 7/0522; A61G 7/0524
See application file for complete search history.

(56) References Cited

U.S. PATENT DOCUMENTS

| | | | |
|---|---|---|---|
| 329,663 | A | 11/1885 | McMurray |
| 1,066,976 | A | 7/1913 | Atkinson |

(Continued)

FOREIGN PATENT DOCUMENTS

| | | | |
|---|---|---|---|
| FR | 2906988 | A1 | 4/2008 |
| FR | 2906988 | B3 | 2/2009 |

(Continued)

OTHER PUBLICATIONS

S. Heh, Log of Meeting, Directorate for Engineering Sciences, Dec. 15, 1999, U.S. Consumer Products Safety Commission, U.S.A.

(Continued)

*Primary Examiner* — Eric J Kurilla
*Assistant Examiner* — Amanda L Bailey

(57) ABSTRACT

A bed rail having an operating position at one of the sides of a bed and a stored position between a mattress and box spring of the bed. To take down the bed rail, a guard frame portion is disengaged from a base frame portion, then the guard frame portion is pivoted and slid into the base frame portion. To set up the bed rail, the guard frame portion can be slid out of the base frame portion, pivoted relative to the base frame portion, then engaged to the base frame portion and into the operating position at a side of the bed.

1 Claim, 21 Drawing Sheets

Related U.S. Application Data

Sep. 6, 2015, now Pat. No. 9,687,081, which is a continuation of application No. 14/159,269, filed on Jan. 20, 2014, now Pat. No. 9,125,498, which is a continuation of application No. 13/758,331, filed on Feb. 4, 2013, now Pat. No. 8,631,525, which is a continuation-in-part of application No. 13/345,700, filed on Jan. 7, 2012, now Pat. No. 8,365,324, which is a continuation of application No. 13/053,191, filed on Mar. 21, 2011, now Pat. No. 8,091,163, which is a continuation of application No. 11/352,100, filed on Feb. 9, 2006, now Pat. No. 7,908,689.

(60) Provisional application No. 60/652,663, filed on Feb. 10, 2005.

(56) References Cited

U.S. PATENT DOCUMENTS

| | | | | |
|---|---|---|---|---|
| 2,594,926 | A | 4/1952 | Hoffman | |
| 2,611,909 | A | 9/1952 | Dillon et al. | |
| 2,649,594 | A | 8/1953 | Herz et al. | |
| 2,722,693 | A | 11/1955 | Wolf | |
| 2,750,605 | A | 6/1956 | Blevins | |
| 2,751,608 | A | 6/1956 | Lucas | |
| 2,763,014 | A | 9/1956 | Luger | |
| 3,474,473 | A | 10/1969 | Hannaberg | |
| 4,811,436 | A | 3/1989 | Schwartz | |
| 4,833,743 | A | 5/1989 | Howell et al. | |
| 5,437,067 | A | 8/1995 | Bernstein et al. | |
| 5,519,905 | A | 5/1996 | Bernstein et al. | |
| 5,557,817 | A | 9/1996 | Haddock | |
| 5,596,776 | A | 1/1997 | Huang | |
| 5,640,726 | A * | 6/1997 | Fichner-Rathus | A47C 21/08 5/426 |
| 5,671,490 | A | 9/1997 | Wu | |
| 5,761,756 | A | 6/1998 | Nowak et al. | |
| 5,781,945 | A * | 7/1998 | Scherer | A47C 21/08 5/426 |
| 5,845,349 | A | 12/1998 | Tharalson et al. | |
| 6,112,347 | A | 9/2000 | Tharalson et al. | |
| 6,134,731 | A | 10/2000 | Thom et al. | |
| 6,148,456 | A | 11/2000 | Tharalson et al. | |
| 6,202,228 | B1 | 3/2001 | Cox | |
| 6,289,539 | B1 | 9/2001 | Alpern | |
| 6,374,437 | B1 | 4/2002 | Voelker | |
| 6,401,280 | B1 | 6/2002 | Baker | |
| 6,453,490 | B1 | 9/2002 | Cardinale | |
| 6,550,082 | B2 | 4/2003 | Tharalson et al. | |
| 6,578,211 | B2 | 6/2003 | Tharalson et al. | |
| 6,704,949 | B2 | 3/2004 | Waldman et al. | |
| 6,725,476 | B2 | 4/2004 | Macari | |
| 6,728,981 | B1 | 5/2004 | Gutierrez | |
| 6,795,988 | B2 | 9/2004 | Hueppe | |
| 6,862,757 | B2 | 3/2005 | Andriunas et al. | |
| 6,877,173 | B2 | 4/2005 | Tharalson et al. | |
| 6,931,677 | B2 | 8/2005 | Tharalson et al. | |
| 6,934,981 | B2 | 8/2005 | Waldman et al. | |
| 6,952,846 | B2 | 10/2005 | Flannery et al. | |
| 6,952,847 | B1 | 10/2005 | Cleary | |
| 6,959,463 | B2 | 11/2005 | Macari | |
| 6,990,697 | B1 | 1/2006 | Clute | |
| 7,013,508 | B2 | 3/2006 | Wu | |
| 7,024,708 | B2 | 4/2006 | Tomas et al. | |
| 7,028,353 | B2 | 4/2006 | Waldman et al. | |
| 7,028,354 | B2 | 4/2006 | Nygren et al. | |
| 7,055,193 | B2 | 6/2006 | Macari et al. | |
| 7,080,419 | B2 | 7/2006 | Macari | |
| 7,137,158 | B2 | 11/2006 | Flannery et al. | |
| 7,178,184 | B2 | 2/2007 | Flannery et al. | |
| 7,181,788 | B2 | 2/2007 | Flannery et al. | |
| 7,237,285 | B2 | 7/2007 | Brewin et al. | |
| 7,640,606 | B2 | 1/2010 | Flannery et al. | |
| 7,908,689 | B2 | 3/2011 | Flannery | |
| 8,091,163 | B2 | 1/2012 | Flannery | |
| 8,365,324 | B2 | 2/2013 | Flannery | |
| 2002/0083524 | A1 | 7/2002 | Tharalson et al. | |
| 2002/0152550 | A1 | 10/2002 | Tharalson et al. | |
| 2003/0024047 | A1 | 2/2003 | Wu | |
| 2003/0126681 | A1 | 7/2003 | Tharalson et al. | |
| 2003/0177574 | A1 | 9/2003 | Waldman | |
| 2003/0196264 | A1 | 10/2003 | Tharalson et al. | |
| 2003/0229941 | A1 * | 12/2003 | Hueppe | A61G 7/0507 5/430 |
| 2004/0040089 | A1 | 3/2004 | Flannery et al. | |
| 2004/0049849 | A1 | 3/2004 | Macari et al. | |
| 2004/0154100 | A1 | 8/2004 | Macari et al. | |
| 2004/0168251 | A1 | 9/2004 | Waldman et al. | |
| 2004/0181873 | A1 | 9/2004 | Waldman et al. | |
| 2004/0187209 | A1 | 9/2004 | Flannery et al. | |
| 2004/0250347 | A1 * | 12/2004 | Brewin | A61G 7/051 5/426 |
| 2005/0034232 | A1 | 2/2005 | Martin | |
| 2005/0198734 | A1 | 9/2005 | Macari | |
| 2005/0229309 | A1 | 10/2005 | Nygren et al. | |
| 2005/0229310 | A1 | 10/2005 | Flannery et al. | |
| 2005/0235419 | A1 | 10/2005 | Macari | |
| 2005/0246837 | A1 | 11/2005 | Macari et al. | |
| 2005/0262632 | A1 | 12/2005 | Wu | |
| 2006/0026759 | A1 | 2/2006 | Flannery et al. | |
| 2006/0037140 | A1 | 2/2006 | Clute | |
| 2006/0130233 | A1 | 6/2006 | Macari et al. | |
| 2006/0150329 | A1 | 7/2006 | Nygren et al. | |
| 2006/0162075 | A1 | 7/2006 | Waldman et al. | |
| 2006/0174408 | A1 | 8/2006 | Flannery | |
| 2007/0083994 | A1 * | 4/2007 | Miller | A47C 21/08 5/430 |
| 2011/0167560 | A1 | 7/2011 | Flannery | |
| 2011/0219540 | A1 * | 9/2011 | Polevoy | A47C 19/021 5/200.1 |

FOREIGN PATENT DOCUMENTS

| | | | |
|---|---|---|---|
| GB | 2 070 921 | A | 9/1981 |
| GB | 2 225 716 | A | 6/1990 |

OTHER PUBLICATIONS

S. Heh, Log of Meeting, Directorate for Engineering Sciences, Apr. 12, 2000, U.S. Consumer Products Safety Commission, U.S.A.

R. Medford et al., Memorandum, Options to Address Portable Bed Rail Hazards, Jun. 28, 2000, U.S. Consumer Product Safety Commission, U.S.A.

Reexamination No. 90/009,498, filed Jun. 19, 2009 based on U.S. Pat. No. 7,718,184.

Reexamination No. 90/009,499, filed Jun. 19, 2009 based on U.S. Pat. No. 7,137,158, with Reexamination Certificate attached.

Reexamination U.S. Appl. No. 90/009,500, filed Jun. 19, 2009 based on U.S. Pat. No. 6,952,846, with Reexamination Certificate attached.

Regalo International, LLC, Hide Away Bed Rail, Model 4010 HD Instruction Manual, 13 pages, approximately 2010.

Regalo International, LLC, Hide Away Bed Rail Instructions, Model: 4010 HD and 5010HD, 37 pages, approximately May 10, 2010.

Regalo International, LLC, Hide Away Bed Rail, Model 4010 HD, 9 pages, approximately 2006.

American Heritage Dictionary definition of "support" (n.d.) American Heritage Dictionary of the English Language, Fifth Edition (2011). Retrieved Jan. 7, 2019 from https://www.thefreedictionary.com/support (Year: 2011).

English Translation of FR 2906988 (Year: 2008).

English Translation of FR 2906988 (Year: 2009).

* cited by examiner

Fig.15A.
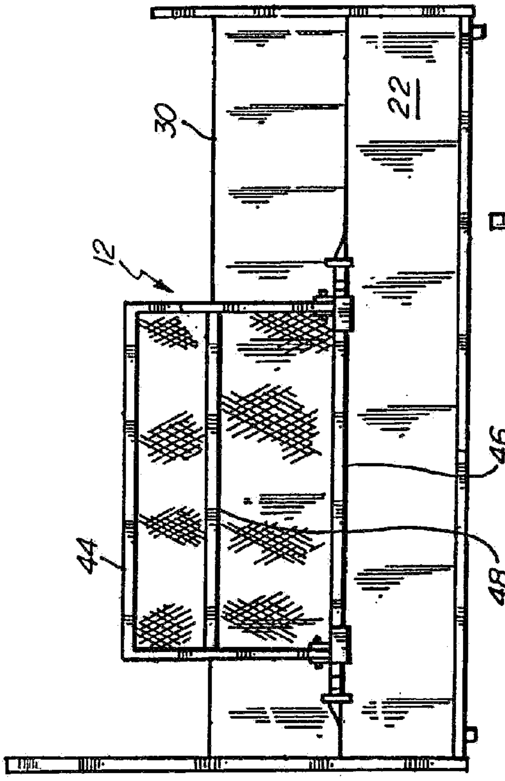
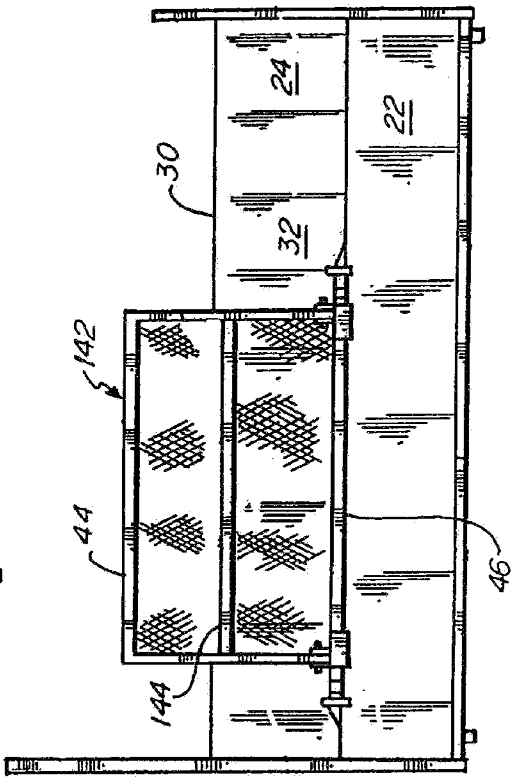
Fig.15B.

HIDE AWAY BED RAIL

This application is a continuation of U.S. patent application Ser. No. 17/198,221 filed Mar. 10, 2021 (U.S. Pat. No. 11,666,154) and claims the benefit thereof under 35 U.S.C. § 120, which application is a continuation of U.S. patent application Ser. No. 16/847,614 filed Apr. 13, 2020 (U.S. Pat. No. 10,945,532) and claims the benefit thereof under 35 U.S.C. § 120, which application is a continuation of U.S. patent application Ser. No. 15/632,372 filed Jun. 25, 2017 (U.S. Pat. No. 10,617,222) and claims the benefit thereof under 35 U.S.C. § 120, which application is a continuation of U.S. patent application Ser. No. 14/846,821 filed Sep. 6, 2015 (U.S. Pat. No. 9,687,081) and claims the benefit thereof under 35 U.S.C. § 120, which application is a continuation of U.S. patent application Ser. No. 14/159,269 filed Jan. 20, 2014 (U.S. Pat. No. 9,125,498) and claims the benefit thereof under 35 U.S.C. § 120, which application is a continuation of U.S. patent application Ser. No. 13/758,331 filed Feb. 4, 2013 (U.S. Pat. No. 8,631,525) and claims the benefit thereof under 35 U.S.C. § 120, which application is a continuation of U.S. patent application Ser. No. 13/345,700 filed Jan. 7, 2012 (U.S. Pat. No. 8,365,324) and claims the benefit thereof under 35 U.S.C. § 120, which application is a continuation of U.S. patent application Ser. No. 13/053,191 filed Mar. 21, 2011 (U.S. Pat. No. 8,091,163) and claims the benefit thereof under 35 U.S.C. § 120, which application is a continuation of U.S. patent application Ser. No. 11/352,100 filed Feb. 9, 2006 (U.S. Pat. No. 7,908,689) and claims the benefit thereof under 35 U.S.C. § 120, which application is a nonprovisional of U.S. Provisional Patent Application No. 60/652,663 filed Feb. 10, 2005 and claims the benefit thereof under 35 U.S.C. 119 (e), all of which provisional and nonprovisional patent applications are hereby incorporated by reference in their entireties into this application.

FIELD OF THE INVENTION

The present invention relates generally to a bed rail, particularly to a bed rail having an operating position at a side of a bed and a stored position below a sleeping surface of the bed and between two sides of the bed, and specifically to a bed rail having a guard frame portion that is pivotable and slideable between the operating and stored positions.

BACKGROUND OF THE INVENTION

Some bed rails are fixed such that the bed rail is relatively permanently engaged to the frame of a bed. Other bed rails are on the bed at night, removed in the morning, and then placed on the bed again at night. Yet other bed rails swing out like a door for access to and from the bed. Still other bed rails swing from an operating position at the side of a mattress to a stored position at the side of a box spring. Most beds have no bed rails.

SUMMARY OF THE INVENTION

A feature of the present invention is the provision in a bed rail, of the bed rail having an operating position and a stored position, with the operating position being at a first side of a bed, with the stored position being under a sleeping surface of the bed, and of the bed rail having a guard frame portion that can be disposed in each of the operating and stored positions.

Another feature of the present invention is the provision in a bed rail, of the bed rail having a guard frame portion and a base frame portion, and of the guard frame portion being slideable into the base frame portion.

Another feature of the present invention is the provision in a bed rail, of the bed rail having a guard frame portion and a base frame portion, and of the guard frame portion being pivotable relative to the base frame portion.

Another feature of the present invention is the provision in a bed rail, of a bed rail that 1) is less than the length of an ordinary sized bed and preferably has a length between about 2.5 feet and 5.0 feet, more preferably between about 3.0 feet and 4.5 feet, and even more preferably between about 3.0 feet and 4.0 feet in length, 2) can be disassembled so as to be sold and stored in an elongate bag or package, 3) meets safety regulations, 4) has sheeting that can be readily removed for washing, and 5) has a guard frame portion that can be easily put up at night and stored in an out-of-the-way position during the day. The embodiments of the present invention have all five such features.

Another feature of the present invention is the provision in a bed rail having a guard frame portion slideable into a base frame portion, of first and second locations or points of connection where the guard frame portion engages the base frame portion, of the first and second locations being spaced from each other in a depth direction and being generally in a first plane at a side of the bed, and, optionally, of at least one of the first and second locations being lockable such that the guard frame portion can be locked in the first plane.

Another feature of the present invention is the provision in a bed rail having a guard frame portion slideable into a base frame portion, of first and second locations or points of connection where the guard frame portion engages the base frame portion, of the first and second locations being spaced from each other in a depth direction and being generally in a first plane at a side of the bed, and of first and second counter members engaged to the base frame portion and being engagable to opposite sides of the bed such that the base frame portion hugs the bed.

Another feature of the present invention is the provision in a bed rail, of the bed rail having a guard portion and a base frame portion, and of the bed rail having at least one point of connection, or optionally a lock, to fix the guard frame portion relative to the base frame portion.

Another feature of the present invention is the provision in a bed rail having a guard portion and a base frame portion that are slideable and pivotable to each other, with such portions being slideable and pivotable at different times depending upon the position of the guard frame portion, and with such portions being slideable and pivotable at the same time depending upon the position of the guard frame portion.

Another feature of the present invention is the provision in a bed rail having a guard frame portion and a base frame portion that are slideable relative to each other, of the guard frame portion having one of a track and rider, of the base frame portion having one of a track and rider, and of the track engaging the rider such that the guard frame portion is slideable relative to the base frame portion.

Another feature of the present invention is the provision in a bed rail having a guard frame portion and a base frame portion that are slideable relative to each other, of a track and rider arrangement, with one of the guard frame portion and base frame portion having a track and a seat offset from the track such that the guard portion and base frame portions can be pivotable relative to each other when the rider is in the seat.

Another feature of the present invention is the provision in a bed rail having a guard frame portion and a base frame portion that are slideable relative to each other, of a method having the steps of fixing a guard frame portion in an operating position at a side of a bed, unlocking the guard frame portion relative to a base frame portion, pivoting the guard frame portion relative to the base frame portion, and then sliding the guard frame portion into the base frame portion.

Another feature of the present invention is the provision in a bed rail having a guard frame portion and a base frame portion that are slideable relative to each other, of a method having the steps of sliding the guard frame portion out of the base frame portion, swinging the guard frame portion relative to the base frame portion, and locking the guard frame portion into a fixed relationship with the base frame portion.

Another feature of the present invention is the provision in a bed rail having a guard frame portion and a base frame portion that are slideable relative to each other, of guard support receptors that do double duty by, on one side, engaging the guard frame portion and by, on the other side, acting as first side bed counter members for opposing the second side bed counter members.

An advantage is safety. One feature contributing to this advantage is that the present bed rail can be fixed or locked in its operating position at a side of the bed. Another feature contributing to this advantage is that the bed rail is manually unfastened or manually unlocked from its operating position. Another feature contributing to this advantage is that a relatively great portion of the bed rail is tucked away in an out-of-the-way position such that use of the bed rail as a toy or ladder is minimized.

Another advantage of the present invention is a quick take down and storage. The present bed rail can almost immediately be taken down from an operating position and put down into a stored position.

Another advantage of the present invention is a quick set up from storage. The present bed rail can almost immediately be taken out of a stored position and put up into an operating position.

Another advantage of the present invention is cost. The present bed rail is inexpensive to manufacture.

Another advantage of the present invention is simplicity. Merely fixing or locking, pivoting and sliding operations are utilized. There is no disassembly of tubing.

Another advantage of the present invention is ease of operation. The points of connection are readily unfastened, or the locks are readily unlockable, when the bed rail is being taken down. The points of connection are easily engaged, or the locks are easily locked, when the bed rail is being set up.

Another advantage is that the base frame portion can be readily set up to hug the bed so as to serve as a support for the guard frame portion. One feature contributing to this advantage is a rigid counter member, namely the guard support receptor, that is rigidly engaged to the base frame portion and confronts or is generally in a first plane at a first side of the bed in which the guard frame member is disposed in its operating position. Another feature contributing to this advantage is an adjustable counter member that is engaged to the base frame portion at a position confronting the first side of the bed, that is engagable to the second side of the bed, and that is operable from the first side of the bed such that the adjustable counter member can be adjusted or tightened and locked from a position close to or at the first side of the bed.

Another advantage of the present invention is that the guard frame portion is rigid and sturdy in its operating position. One feature contributing to this advantage is the fast and secure fixing of the base frame portion to the opposite sides of the bed by the first and second counter members such that the base frame portion is a true base for the guard frame portion. Another feature contributing to this advantage is a two point or two location connection where the two points or two locations are spaced from each other in the depth direction. At each of the points or locations, the guard frame portion engages the base frame portion. Each of the locations may include a seat for a rider or pin, a connection or lock such as a retractable pin, a connection or lock such as a wrap around hinged piece, or some other structure that effectively engages the base frame portion to the guard frame portion. Since two points or two locations are utilized, movement of the guard frame portion when the guard frame portion is in the operating position is minimized or effectively eliminated.

BRIEF DESCRIPTION OF THE DRAWINGS

FIG. 15A shows the embodiment of the guard frame portion of FIG. 1A.

FIG. 15B shows yet another embodiment of the guard frame portion of FIG. 1A.

DESCRIPTION

Figure 1A:
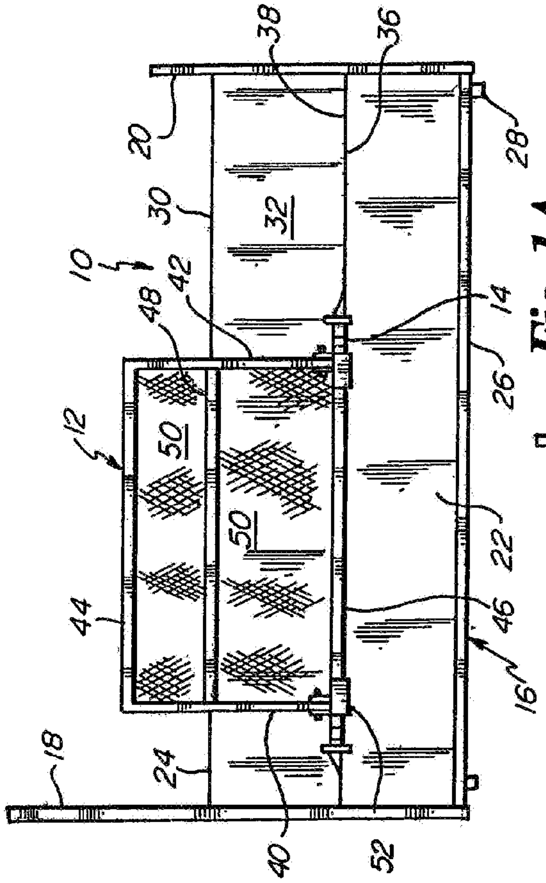
FIG. 1A is a side view of one embodiment of the present hide away bed rail in an operating position on a bed having a mattress and a box spring, with a guard frame portion disposed on the side of the bed and with a base frame portion tucked between the mattress and box spring.
Figure 1B:
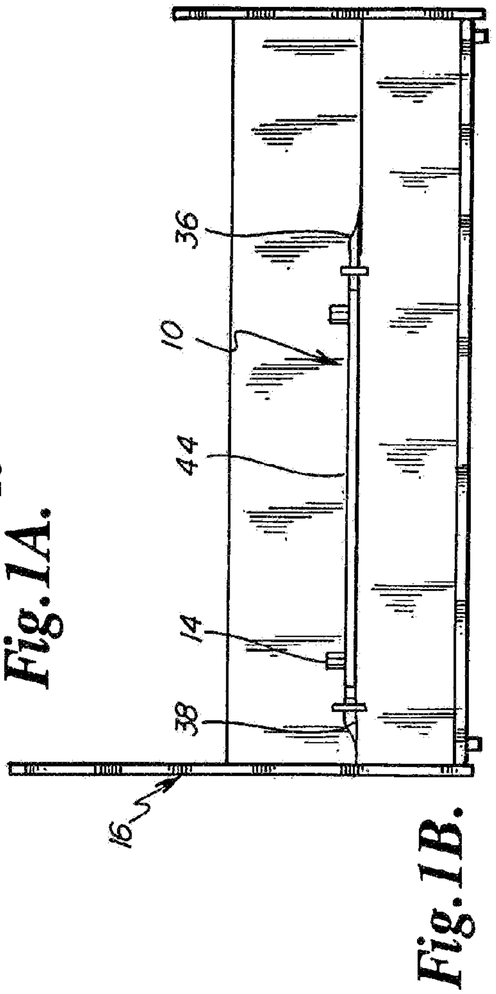
FIG. 1B is a side view of the embodiment of FIG. 1A in a stored position wherein the guard frame portion has been slid into the base frame portion tucked between the mattress and box spring.

One embodiment of the present bed rail is a bed rail 10 shown in FIGS. 1A, 1B, 3 and 4. Bed rail 10 includes a guard frame portion or first frame portion 12 and a base frame portion or second frame portion 14.

Bed rail 10 is preferably engaged to a bed 16. Bed 16 includes a headboard 18, a footboard 20, a box spring 22, and a mattress 24. Bed 10 can further include a box spring frame 26 having casters or feet 28. Mattress 24 includes a sleeping surface 30 and first and second sides 32. Box spring 22 includes first and second sides 34 that are generally coplanar with respective first and second sides 32 of mattress 24. Mattress 24 further includes an underside or under face 36 and box spring 22 further includes an upper side or upper face 38. The underside 36 of the mattress 24 confronts the upper face 38 of the box spring 22.

Guard frame portion 12 includes a pair of side support members 40, 42, an upper or outer support member 44 engaged between the side support members 40, 42, a lower support member 46 engaged between the side support members 40, 42, and an intermediate support member 48 engaged between the side support members 40, 42. When the guard frame portion 12 is in the operating position, intermediate support member 48 lies coplanar with, or confronts, a plane of a sleeping surface 30 to maximize the closing off of any gaps that may form between side 32 and guard frame portion 12. The guard frame portion 12 further includes a sheeting or wall 50 in the interior of the guard frame portion 12. Sheeting or wall 50 extends between upper support member 44, intermediate support member 48, and side support members 40, 42. Sheeting or wall 50 further extends between intermediate support member 48, lower support member 46, and side support members 40, 42. Sheeting or wall 50 can, within a sleeve, envelope a portion of intermediate support member 48, a portion of upper support member 44, and a portion of lower support member 46. Sheeting or wall 50 can be a flexible sheet element such as a mesh or a fabric. Sheeting or wall 50 can be a rigid or semi-rigid wall formed of a wood, metal or composite material. Side support members 40, 42, upper support member 44, intermediate support member 48 and lower support member 46 can be or include tubing.

The guard frame portion 12 further includes a corner support or corner connection 52 for connecting lower support member 46 to each of the side support members 40, 42. Corner connection 52 includes a receptor for one end portion of lower support member 46. Corner connection 52 further includes another receptor for one end portion of one of the respective side support members 40, 42. Within the corner connection 52, an end portion of lower support member 46 confronts an end portion of one of the side support members 40, 42, as shown in FIGS. 11A, 11B.

Figure 11D:
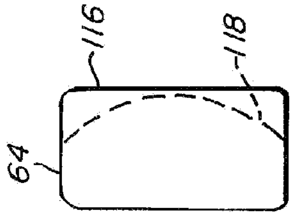
FIG. 11D is an isolated view of the rider of the second lock of FIG. 11A.
Figure 11B:
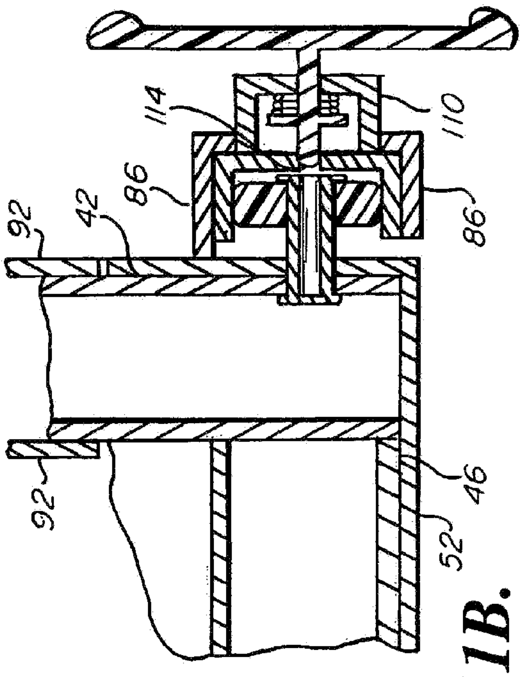
FIG. 11B is a diagrammatic view of a rider of the guard frame portion engaging a track of the base frame portion and shows the second lock of FIG. 5 unlocked.
Figure 11A:
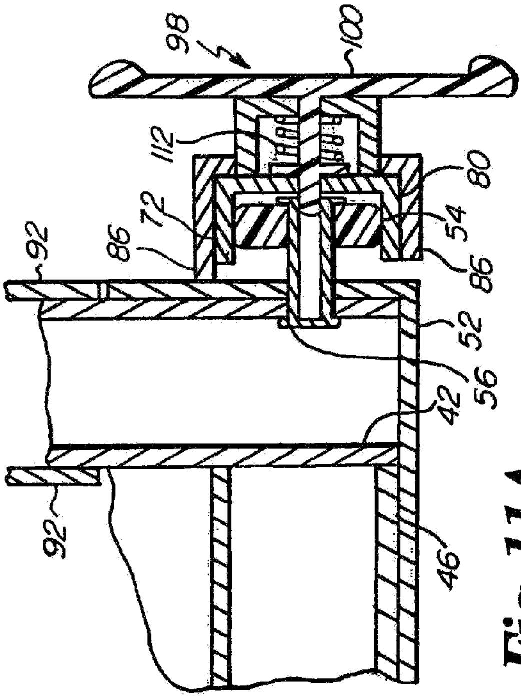
FIG. 11A is a diagrammatic view of a rider of the guard frame portion engaging a track of the base frame portion and shows the second lock of FIG. 5 locked.

As also shown in FIGS. 11A, 11B, guard frame portion 12 further includes a rider 54 on an axle 56. Axle 56 is engaged to one of the side support members 40, 42. Axle 56 has one closed end and one open end. Rider 54 is preferably a wheel. Axle 56 and the open end of the axle can be referred to as a lock or locking portion, and is one part of a two point or two location connection.

Figure 8:
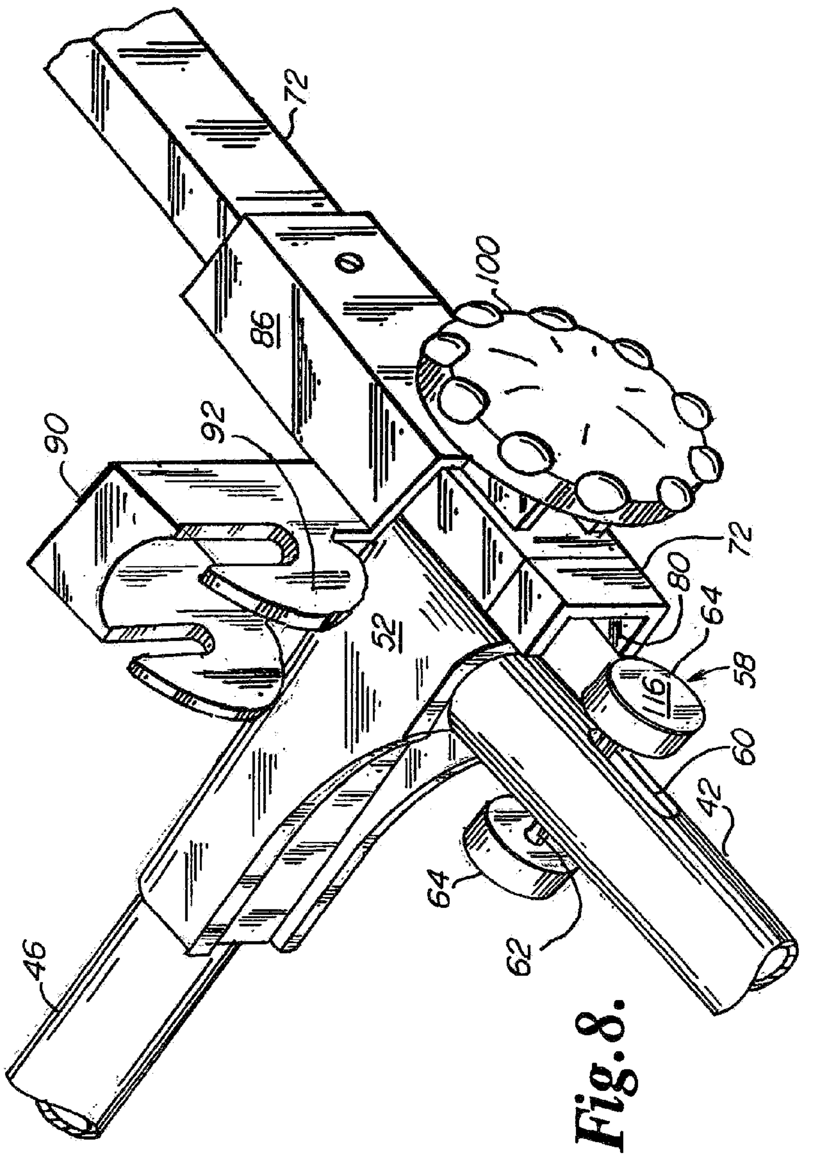
FIG. 8 is a perspective detail view of the bed rail embodiment of FIG. 1A, shows the first lock of FIG. 5 unlocked, shows the guard frame portion having been pivoted relative to the base frame portion, and shows the second lock locked.
Figure 12B:
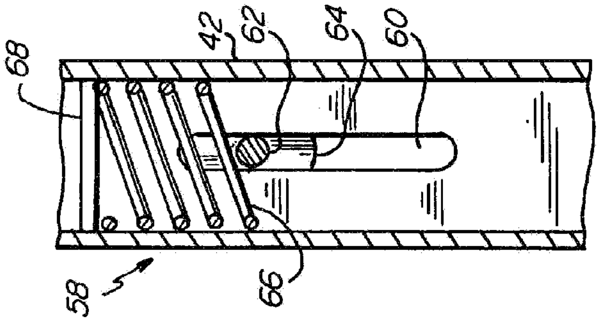
FIG. 12B is a diagrammatic view of a portion of the first lock of FIG. 5, with the first lock in an unlocked position biased toward the locked position, and with the coil spring of the first lock in a retracted and compressed position.
Figure 12A:
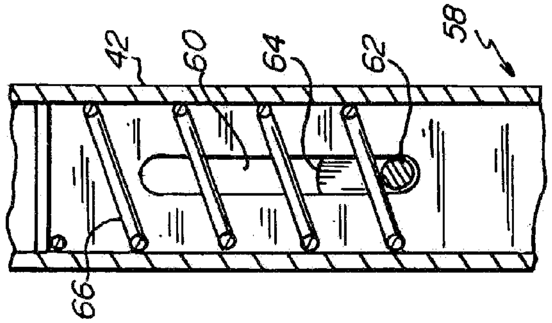
FIG. 12A is a diagrammatic view of a portion of the first lock of FIG. 5, with the first lock in a locked position, and with the coil spring of the first lock in an extended position.

As shown in FIGS. 8, 12A and 12B, guard frame portion 12 further includes a lock portion 58 in each of the side support members 40, 42, and this lock portion 58 is the other part of the two point or two location connection. Lock portion 58 includes a slot 60 formed longitudinally in the respective side support member 40 or 42. A pin 62 slides longitudinally in the slot 60 and includes a pair of riders 64 on each of the end portions of the pin 62. Lock portion 58 further includes, as shown in FIGS. 12A, 12B, a coil spring 66 or other bias member that is pinched between an internal tube support 68 and the pin 62. FIG. 12A shows a locked position for the locking portion 58 and FIG. 12B shows an unlocked position for the locking portion 58. The coil spring 66 biases the locking portion 58 towards the locking position shown in FIG. 12A, whereupon the pin 62 comes to rest at one of the ends of the slot 60. In the unlocked position shown in FIG. 12B, pin 62 is spaced from the other end of the slot 60.

Figure 2A:
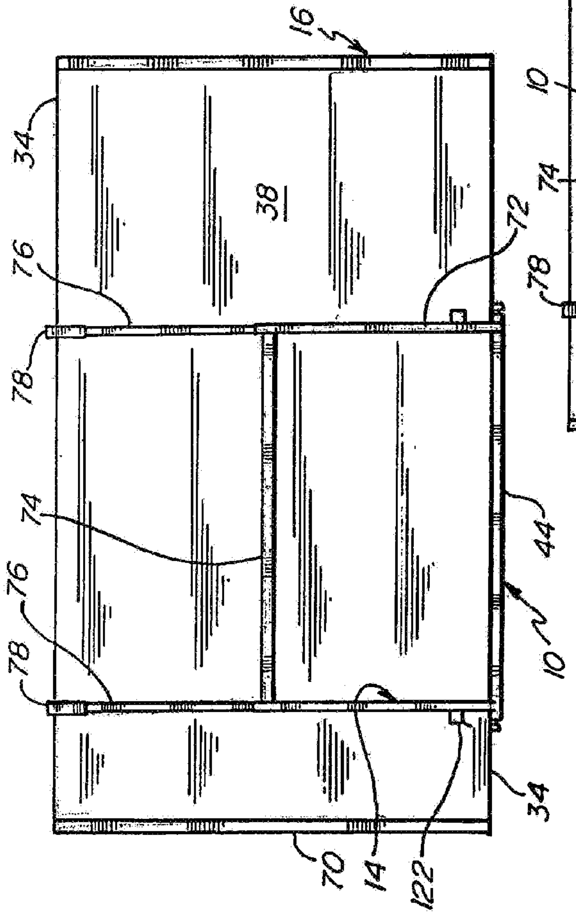
FIG. 2A is a top view of the embodiment of FIG. 1A, in the operating position of FIG. 1A, with the mattress of the bed removed.
Figure 2B:
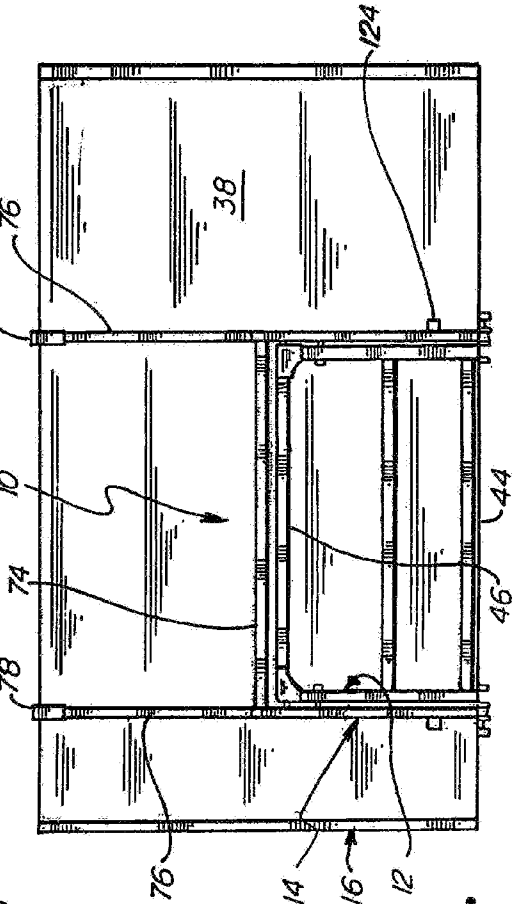
FIG. 2B is a top view of the embodiment of FIG. 1A, in the stored position of FIG. 1B, with the mattress of the bed removed.

Base frame portion 14 includes, as shown in FIGS. 2A, 2B, a pair of tracks 70, 72. Tracks 70, 72 are preferably joined at end portions for support via a support member or cross tube 74, shown in FIGS. 2A, 2B whereupon, if support member 74 is included, base frame portion 14 is generally U-shaped when viewed from the top as in FIGS. 2A and 2B. Each of the tracks 70, 72 can be about 22 inches in length. In the event that support member 74 is not included, tracks 70, 72 are spaced apart in a supported manner by guard frame portion 12. Cross tube 74 can be a two part piece that is assembled when the bed rail 10 is assembled.

With or without support member 74, base frame portion 14 can include members 76 having counters 78. Members 76 can be flexible and formed in the nature of straps, where the straps may be flexible metal or fabric or fabric like straps. Members 76 can be rigid or relatively rigid, such as in the nature of metal tubes or rails such as U-shaped rails. Members 76 engage, at one respective end, a portion of base frame portion 14 such as end portions of tracks 70, 72. Members 76 engage, at the other respective end, one respective counter member 78. Counter member 78 can engage mattress side 32 only or box spring side 34 only or can engage sides 32, 34 at the same time. Counter member 78 can be an L-shaped end tube for engaging one of the mattress side 32 or box spring side 34 or a T-shaped end tube for engaging each of the sides 32, 34. Members 76 can be adjustable in length so as to draw guard frame portion 12 to a hugging position against mattress side 32 and so as to draw intermediate tube 48 against the upper edge of side 32, which upper edge lies in the plane of the sleeping surface 30. Members 76 can include a buckle for such length adjustment at or near the counter members 78 such that such buckle is accessible relative to the side of the bed that the counter members 78 engage. It should be noted that locking portions 82 and 84, which are rigidly affixed to the base frame portion 14, act as counters on the first side of the bed 16, opposite the second side that counter 78 is acting upon. This counter action by locking portions 82 and 84 can be seen in FIGS. 1A, 1B, 2A, and 2B and is specifically applied by the rear face of hook section 90.

Each of the tracks 70, 72 is preferably, in section or when viewed from an end, generally U-shaped or generally C-shaped. Riders 54, 64 ride within the U-shaped or C-shaped interior and on a track portion 80 of said track 70 or 72, as shown in FIG. 8.

The base frame portion 14 further includes a pair of locking portions 82, 84 fixed at respective end portions of the tracks 70, 72. Each of the locking portions 82, 84 is a relatively rigid piece formed of metal or plastic. Each of the locking portions 82, 84 includes a U-shaped base section 86 fixed via pins 88 to said respective end portions of the tracks 70, 72. Extending from the U-shaped base 86 and integral and one-piece with the U-shaped base 86, is a hook section 90 having a pair of hooks 92. Hook section 90 is offset from U-shaped base section 86 such that hook section 90 is generally coplanar with side member 40 or 42 and such that U-shaped base section 86 is coplanar with track 70 or 72. Side support member 40 or 42 is received within one respective pair of hooks 92. Hooks 92 engage one of the pins 62 of one of the lock portions 58 of one respective side member 40, 42. Each of the hooks 92 includes a curved edge or sloping edge 94 leading into an open ended slot 98 for reception of pin 62. Curved edges 94 provide, along with coil spring 66, an automatic locking of pin 62 into hooks 92 when guard frame portion 12 is pivoted into an operating position with base frame portion 14.

Figure 11C:
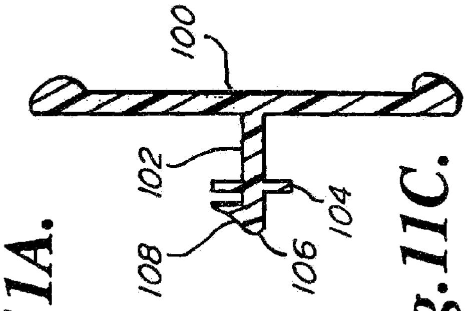
FIG. 11C is an isolated view of the handle of the second lock of FIG. 11A where the handle is rotated ninety degrees relative to the view in FIG. 11A.

Base frame portion 14 further includes locking portions 98, one for each of the tracks 70, 72. As shown in FIGS. 11A, 11B, locking portion 98 includes a handle 100 that is integral and one-piece with a pin 102. Pin 102 is integral and one-piece with a disk 104 and a pin head 106. In one embodiment, as shown in FIG. 11C, pin head 106 includes a curved or sloping surface 108. Locking portion 98 further includes a U-shaped coil spring housing 110 for housing a coil spring 112, which is pinched between one face of the disk 104 and an inner surface of the U-shaped coil spring housing 110. Pin head 106 is received in a slot 114 formed in an end portion of each of tracks 70, 72 and is further received in the open end of axle 56. The sloping surface 108 of pin head 106 permits passage of rider 64 when the guard frame portion 12 is being rolled out of the base frame portion 14.

It can be noted that rider 64 can have a flat face 116 or a spherical face 118, as shown in phantom in FIG. 11D. A rider 64 having a spherical face 118 may more readily pass by and push in pin head 106 when the guard frame portion 12 is being slid out of the base frame portion 14.

It should be noted that rider 64, when having a spherical face 118, may obviate any need for the curved edge 108 of pin head 106, such that curved edge 108 may be deleted and pin head 106 can have a cylindrical shape and such that slot 114 can be of a circular shape rather than of a slotted or elongate shape.

It should be noted that rider 54 too can have the flat face 116 or the spherical face 118. If rider 54 includes the spherical face 118, then curved edge 108 may be eliminated and a cylindrical pin head 106 may be utilized.

In operation, to initially engage the bed rail 10 to the bed 16, the mattress 24 may (or may not) be removed from the box spring 22. Then the bed rail 10 as a whole, preferably in the operating position with the guard frame portion 12 locked in a fixed and upright position relative to the base frame portion 14, is placed on the upper side of the box spring 22. Then the outer ends of the adjustable members 76 and the counters 78 can be placed over the side 34 of the box spring 22 to be accessible once the mattress 24 is placed back on the box spring 22. Then, if the mattress 24 has been removed from the box spring 22, the mattress 24 can be laid back on top of the box spring 22. Then the adjustable members 76 and counters 78 are engaged to one or more of the mattress side 32 and box spring side 34 such that guard frame portion 12 is brought into a hugging relationship with the mattress 24 and such that upper support member 44 confronts or abuts the upper edge of the mattress side 32 to lie in or confront the plane of the sleeping surface 30. At the same time, locking portions 82, 84, functioning as counter members, engage the first side of the bed 16.

Figure 5:
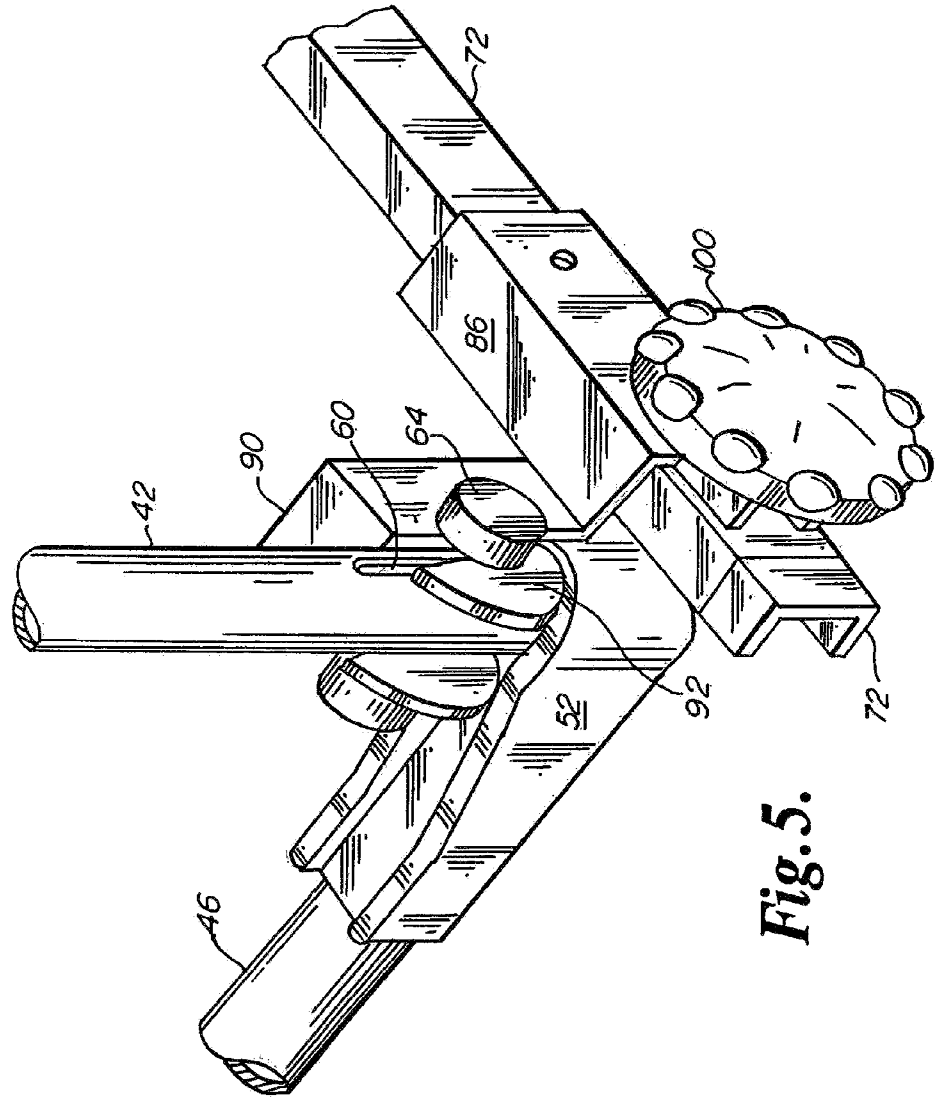
FIG. 5 is a perspective detail view of the bed rail embodiment of FIG. 1A and shows a fixed or locked position of the guard frame portion relative to the base frame portion where a first lock is locked and where a second lock is locked in a two point connection relationship.

As shown in FIGS. 1A and 5, bed rail 10 is in an operating position. That is, guard frame portion 12 is in a generally upright and locked position with intermediate support member 48 abutting or at least confronting the upper edge or an upper edge portion of the side 32 of the mattress so as to close any gaps that otherwise may be present.

In the operating position, as shown in FIG. 5, both of first and second locks are locked. A first lock is an engagement between locking portion 58 (which includes pin 60) and locking portion 82 (which includes hooks 92). A second lock is an engagement between locking portion 56 (which includes axle 56) and locking portion 98 (which includes pin 102), as shown in FIG. 11A.

Figure 6:
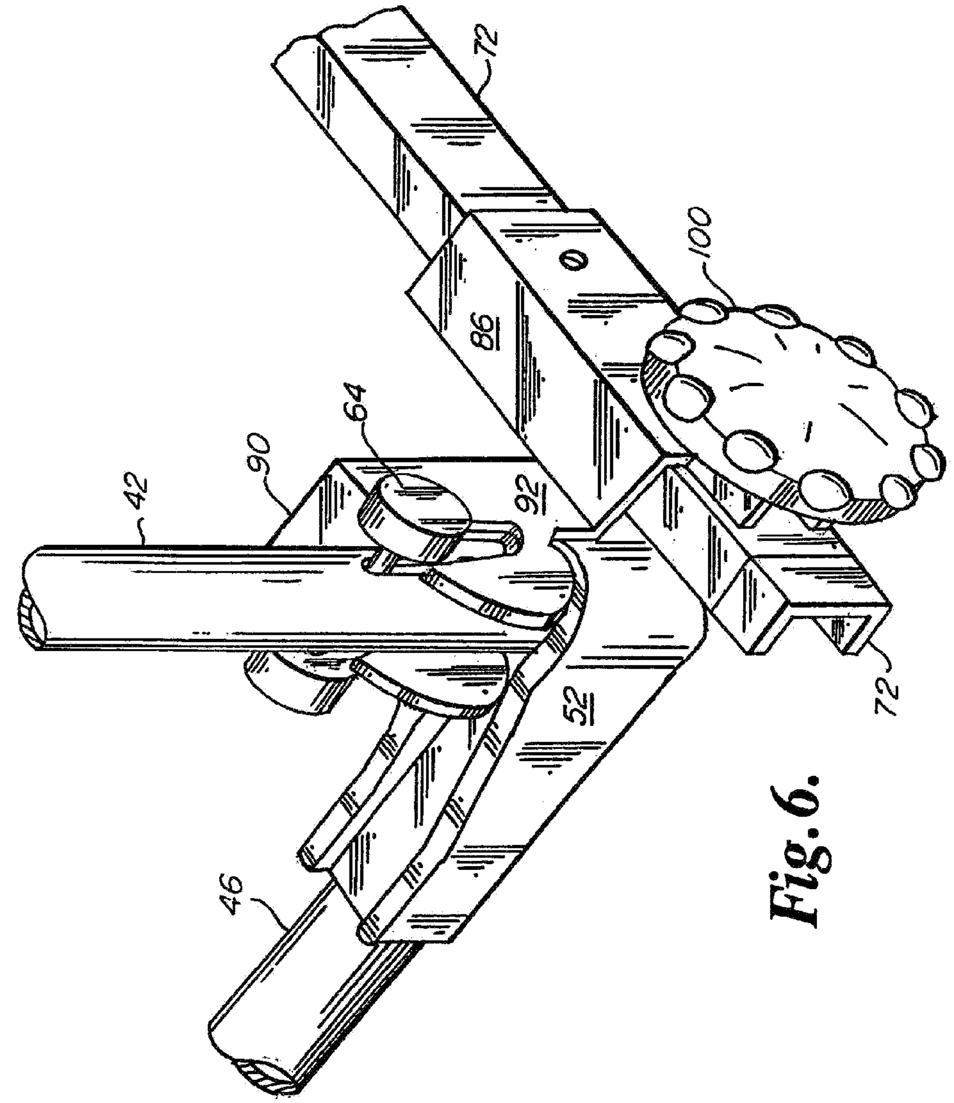
FIG. 6 is a perspective detail view of the bed rail embodiment of FIG. 1A, shows the first lock of FIG. 5 in the process of being unlocked and shows the second lock locked.
Figure 7:
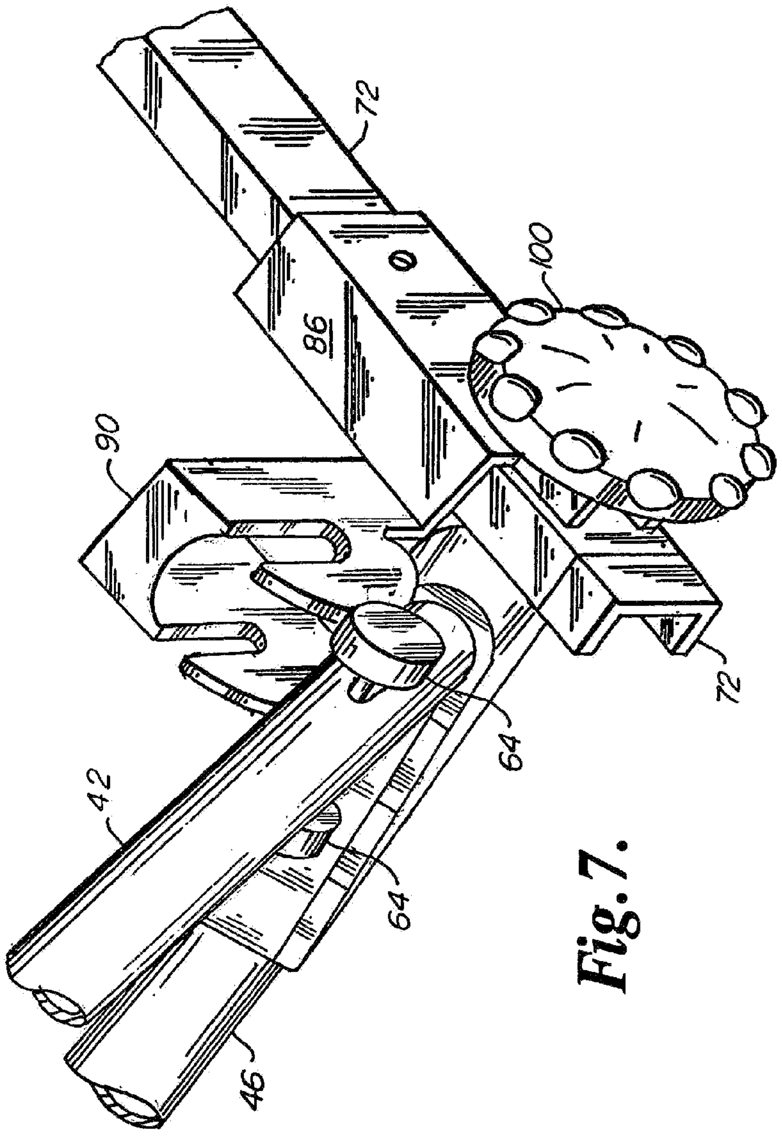
FIG. 7 is a perspective detail view of the bed rail embodiment of FIG. 1A, shows the first lock of FIG. 5 unlocked, shows the guard frame portion being pivoted relative to the base frame portion, and shows the second lock locked.

To begin the process to take down the bed rail 10, as shown in FIG. 6, the first lock is disengaged. That is, riders 64 are lifted upwardly, to in turn lift pin 62 upwardly and compress coil spring 66. After pin 62 clears the upper ends of the hooks 92, the guard frame portion 12 is pivoted such that the upper support member 44 swings downwardly and outwardly, as shown in FIG. 7.

The pivoting of the guard frame portion 12 relative to the base frame portion 14 continues until the guard frame portion 12 lies in substantially the same plane as the tracks 70, 72, as shown in FIG. 8. At such a point, the riders 64 have been released such that the coil spring 66 expands to place pin 62 against an end of slot 60 and to thereby stabilize the pin 62 to in turn stabilize the rider 64 that runs on the track portion 80 and that utilizes pin 62 as an axle. At such a point, an upper surface of connection 52 can make contact with a lower surface of hook section 90, such as a lower surface of hooks 92, to stop a pivoting of guard frame portion 12 relative to base frame portion 14.

Figure 9:
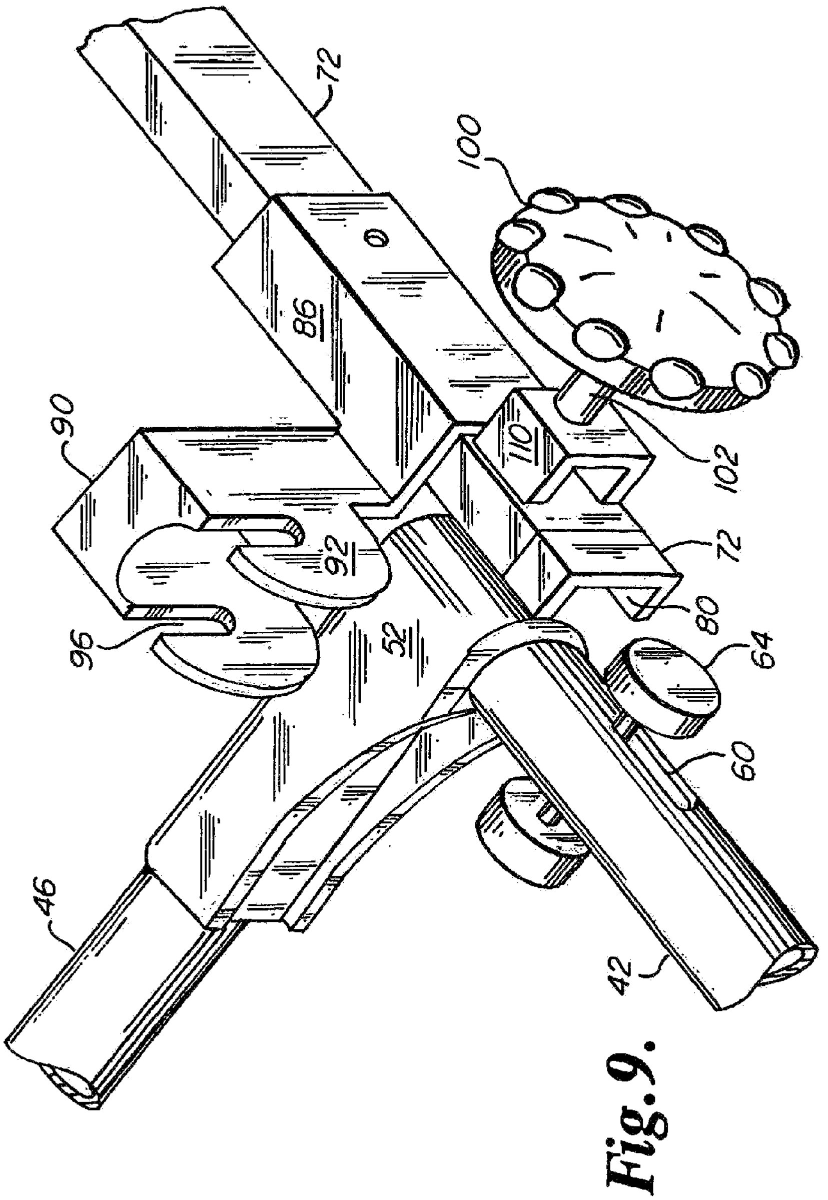
FIG. 9 is a perspective detail view of the bed rail embodiment of FIG. 1A, shows the first lock of FIG. 5 unlocked, shows the guard frame portion having been pivoted relative to the base frame portion, and shows the second lock of FIG. 5 unlocked for sliding the guard frame portion into the base frame portion.
Figure 13C:
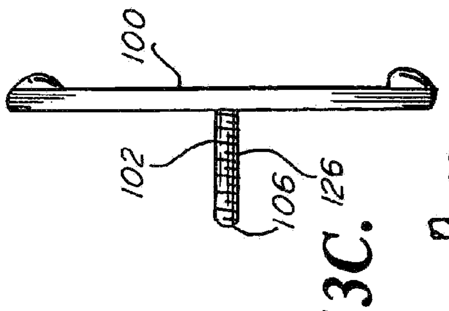
FIG. 13C is a diagrammatic view of a handle of the second lock shown in FIG. 13B.
Figure 13B:
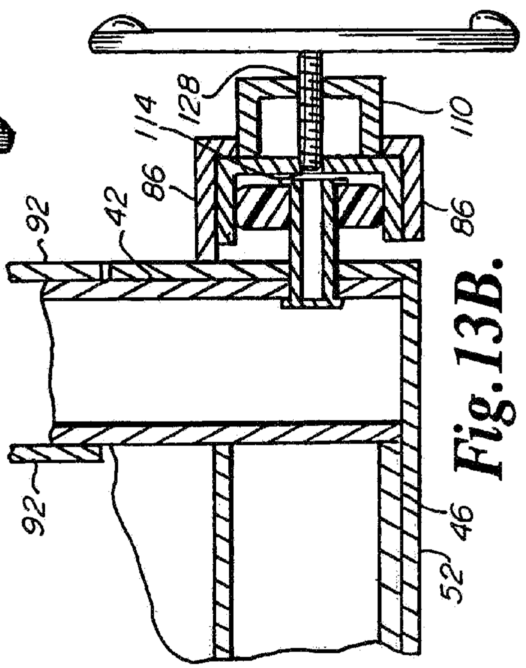
FIG. 13B is a diagrammatic view of a rider of the guard frame portion engaging a track of the base frame portion and shows the embodiment of the second lock of FIG. 13A unlocked where the pin is turned out to disengage the rider.
Figure 13A:
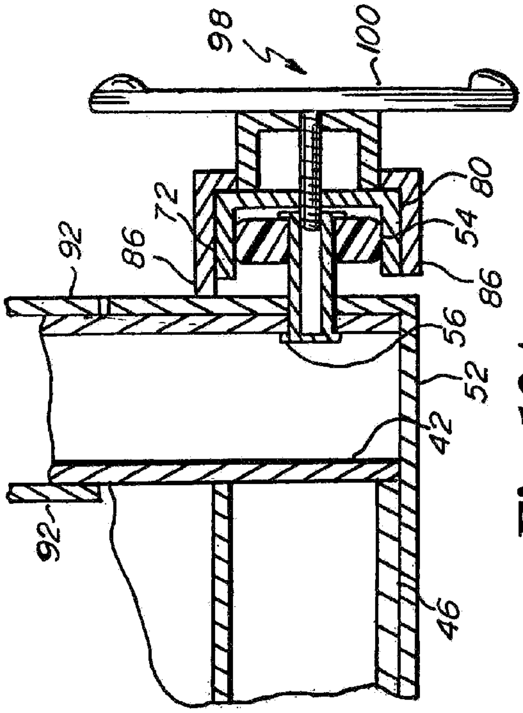
FIG. 13A is a diagrammatic view of a rider of the guard frame portion engaging a track of the base frame portion and shows another embodiment of the second lock of FIG. 5 locked, where the second lock includes a pin that threadingly engages the base frame portion.

Then, as shown in FIG. 9, handle 100 is pulled out (or turned out as shown in FIGS. 13A, 13B and 13C), to pull pin head 106 out of the open end of axle 56 of rider 54, thereby unlocking the second lock and permitting the guard frame portion 12 to slide relative to the base frame portion 14. Handle 100 may be maintained in the pulled out position until guard frame portion 12 is partially pushed into base frame portion 14 such that rider 64 passes beyond pin head 106. However, in the case where rider 64 includes spherical head 118, handle 100 may be maintained in the pulled out position only to dislodge pin head 106 from the open end of axle 56 whereupon handle 100 may be released, whereupon coil spring 112 pushes pin head 106 back into track 72, and whereupon rider 64 can automatically pass by pin head 106 by momentarily pushing pin head 106 out of the way and momentarily compressing coil spring 112.

Figure 3:
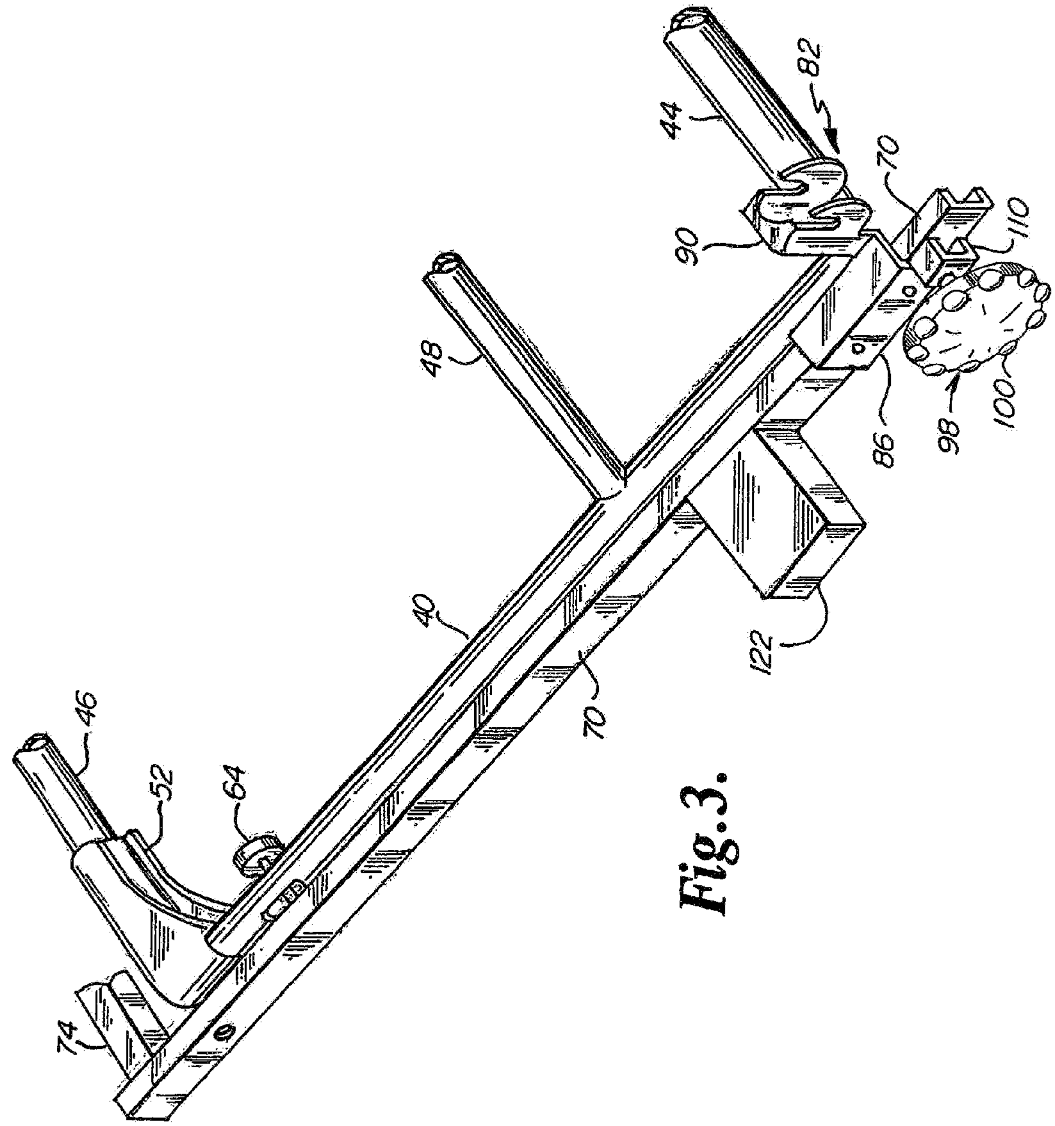
FIG. 3 is a perspective view of a right side portion of the bed rail embodiment of FIG. 1A in the stored position.
Figure 4:
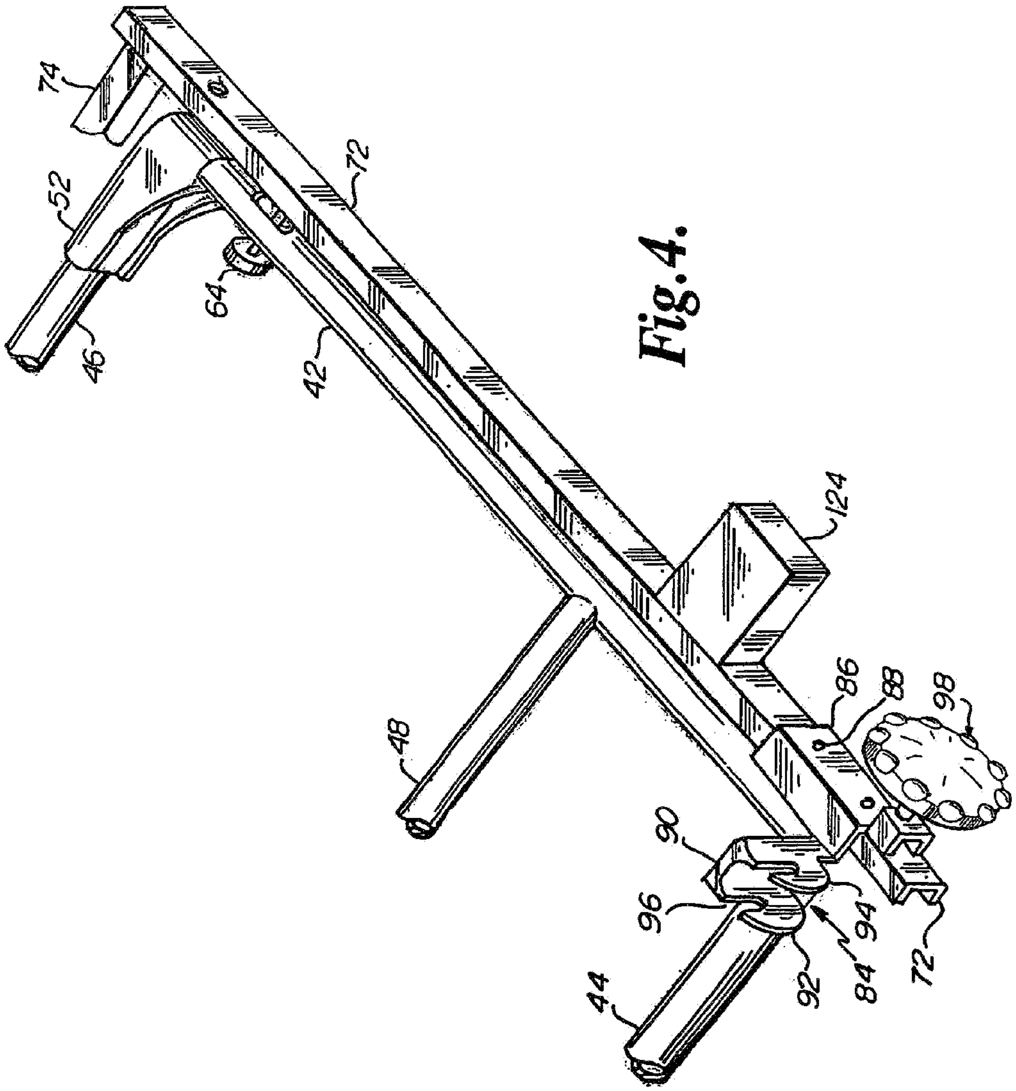
FIG. 4 is a perspective view of a left side portion of the bed rail embodiment of FIG. 1A in the stored position.
Figure 10:
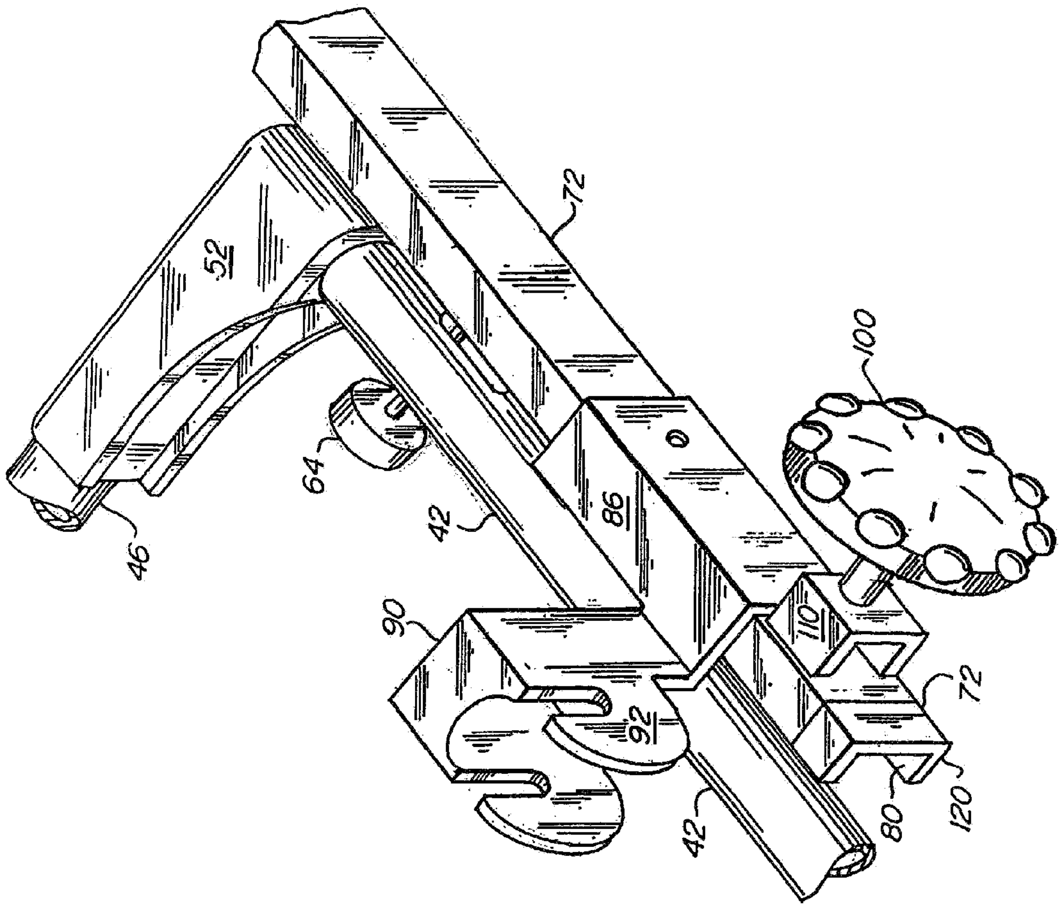
FIG. 10 is a perspective detail view of the bed rail embodiment of FIG. 1A, shows the second lock unlocked, and shows the guard frame portion being slid into the base frame portion.

Then, as shown in FIG. 10, guard frame portion 12 is yet further pushed or rolled into base frame portion 14 by virtue of the riders or rollers 54, 64 rolling on track portion 80 of the tracks 70, 72. FIGS. 2 and 3 show the guard frame portion 12 completely pushed into base frame portion 14, whereupon upper support member 44 is disposed inwardly of lock section 90, as shown in FIGS. 2 and 3 and as further shown in FIG. 2B, such that upper support member 44 has an outer edge generally flush with mattress side 32 and box spring side 34. Such is a stored position of the bed rail 10.

To take the bed rail 10 out of the stored position and to put up the bed rail 10, upper support member 44 is pulled out such that riders or rollers 54, 64 begin to run or roll on the track portions 80 such that guard frame portion 12 begins to slide out of base frame portion 14. As the riders 64 abut the pin heads 106, the pin heads 106 automatically retract (by virtue of the curved edge 108 and/or the spherical face 118 of rider 64). After the riders 64 pass the pin heads 106, the riders 54 confront the pin heads 106. Each of the pin heads 106 is initially automatically pushed out and then automatically snap into its respective open end of its respective axle 56, thereby completing a locking of the second lock and whereupon the guard frame portion 12 is fixed in a pivoting relationship relative to base frame portion 14. (It should be noted that pin heads 106 may be manually controlled by the embodiment of FIGS. 13A, 13B and 13C.) Then the upper support member 44 is swung upwardly and inwardly. As the upper support member 44 is swinging upwardly and inwardly, the pins 62 meet the curved edges 94 of the hooks 92 and automatically begin to compress their respective coil springs 66. When the pins 62 automatically pass over the ends of the hooks 92, the pins 62 automatically snap into their respective open ended slots 96, thereby completing a locking of the first lock. As the pins snap into their respective open ended slots 96, upper support member 44 confronts and may abut the upper edge of the side 32 of mattress 24. As the pins snap into their respective open ended slots 96, the first and second locks are locked and the bed rail 10 is back in an operating position.

Bed rail 10 has an operating position at the mattress side 32 of the bed 16 in generally a first plane and a stored position below sleeping surface 30 in generally a second plane. The stored position is between the underside 36 of the mattress 24 and the upper side 38 of the box spring 22. The stored position is further generally between the two sides of the bed 16, where one side of the bed 10 is defined as a combination of mattress side 32 and box spring side 34. It should be noted that such first and second planes are generally normal to each other, though the first plane may be set at an angle slightly less than ninety degrees such that upper support member 44 can abut the upper edge of mattress 24. Bed 10 includes a lateral direction (defined as the direction between two mattress sides 32) a longitudinal direction (defined as the direction between headboard 18 and footboard 20) and a depth direction (defined as the direction between the sleeping surface 30 and the underside 36 of the mattress 24).

It should be noted that the second lock (having locking portions 56 and 98) is spaced from the first lock (having locking portions 58 and 82) in the depth direction of bed 10 to maximize a stable fixing of the guard rail portion 12 in the operating position.

It should be noted that the outward end portions of tracks 70, 72 can have a rubber or elastomeric piece 120 slipped over such outward end portion since such an outward end portion may slightly protrude from the mattress side 32 and the side 34 of box spring 22. Rubber or elastomeric piece 120 can be generally U-shaped, as shown in FIG. 10. As to bed rail 10, including the intermediate support member 48 disposed in or confronting the plane of the sleeping surface 30 at the upper edge or upper edge portion of the mattress side 32, including the height adjustability of intermediate support member 48, including the angle of the plane of the guard frame portion 12 relative to mattress side 32, including adjustable member 76, and including counter member 78, the Flannery et al. U.S. patent application Ser. No.

10/820,358 filed Apr. 7, 2004 and entitled Mattress Hugging Bed Rail is hereby incorporated by reference in its entirety.

As shown in FIGS. 2A, 2B, 3 and 4, each of the tracks 70, 72 can have a respective stabilizer or stabilizing foot 122, 124 extending outwardly and laterally relative to its respective track 70, 72. Each of the stabilizers 122, 124 can be engaged, such as via pins, to its respective track 70, 72, is about the same height as tracks 70, 72, and extends in the same plane as the tracks 70, 72. Stabilizers 122, 124 minimize any rocking of the bed rail 10 by providing a greater surface area for resistance to any such rocking motion and by providing a greater longitudinal length to the base frame portion 14. Stabilizers 122, 124 further provide greater surface area for a pinching action by the mattress 24 and box spring 22. Stabilizers 122, 124 can be formed of a metal, plastic, wood, or composite material. Stabilizers 122, 124 can be relatively hollow or relatively solid.

FIGS. 13A and 13B show that pin 102 of handle 100 can include threads 126 that can engage a threaded opening 114 in track portion 80, where such threaded opening 114 is a generally circular opening, and that further can engage a threaded opening 128 in coil spring housing 110. In such an embodiment, handle 100 is manually turned to turn pin 102 in and out of the open end of axle 56. FIG. 13A shows the locked position of the second lock and FIG. 13B shows the unlocked position of the second lock where riders 54 and 64 are free to slide or roll by the head 106 of the pin 102.

Figure 14A:
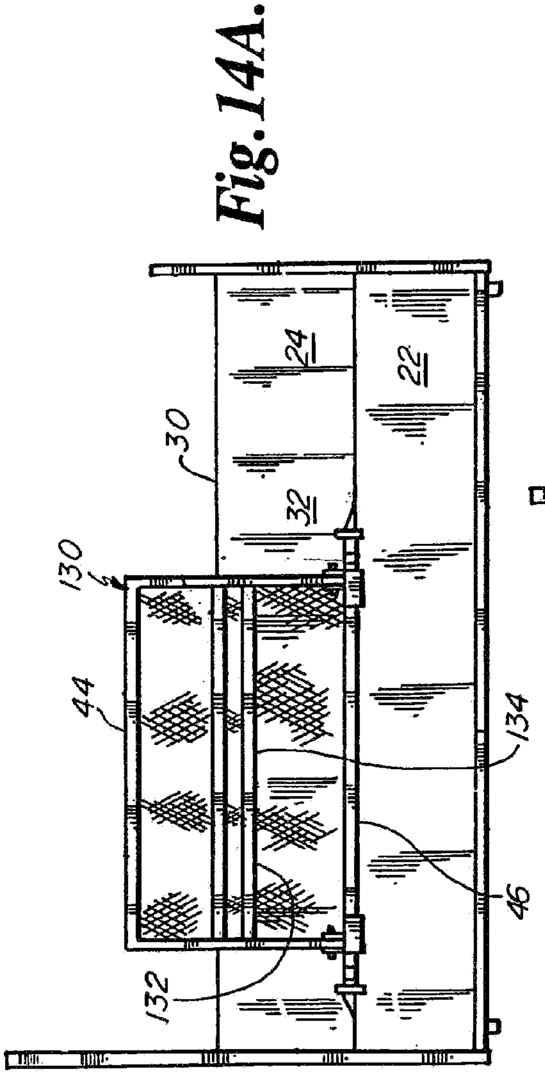
FIG. 14A shows another embodiment of the guard frame portion of FIG. 1A.

FIG. 14A shows a guard frame portion 130 having the upper support member or cross tube 44, the lower support member or cross tube 46, and a pair of upper and lower intermediate support members or cross tubes 132, 134. Upper intermediate support member 132 is shown in the plane of the sleeping surface 30. If desired, upper intermediate support member 132 can be slightly below and confronting the plane of the sleeping surface 30. Lower intermediate support member 134 confronts the plane of the sleeping surface 30 and is positioned slightly below the plane of the sleeping surface 30. The axis of lower intermediate support member 134 may be disposed at a predetermined distance from the axis of lower support member 46 and such predetermined distance is preferably between about six and 10 inches, more preferably between about seven and nine inches, and most preferably about eight inches. Each of the upper and lower intermediate support members 132, 134 confronts the side 32 of the mattress 24.

Figure 14B:
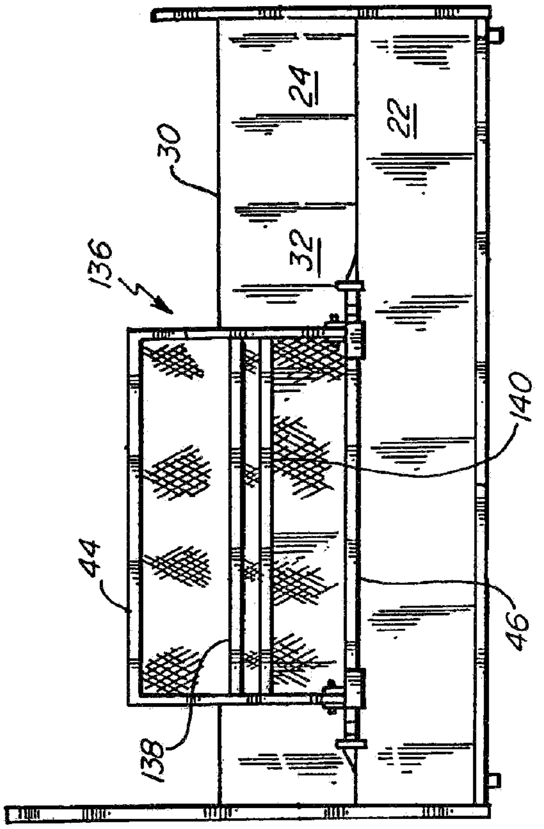
FIG. 14B shows still another embodiment of the guard frame portion of FIG. 1A.

FIG. 14B shows a guard frame portion 136 having the upper support member or cross tube 44, the lower support member or cross tube 46, and a pair of upper and lower intermediate support members or cross tubes 138, 140. Upper intermediate support member 138 confronts the plane of the sleeping surface 30 and is positioned slightly below the plane of the sleeping surface 30. Lower intermediate support member 140 is positioned generally several inches below upper intermediate support member 138. The axis of upper intermediate support member 138 may be disposed at a predetermined distance from the axis of lower support member 46 and such predetermined distance is preferably between about six and 10 inches, more preferably between about seven and nine inches, and most preferably about eight inches. Each of the upper and lower intermediate support members 138, 140 confronts the side 32 of the mattress 24.

FIG. 15A shows the guard frame portion 12 of FIG. 1A where the intermediate support member 48 is disposed in the plane of the sleeping surface 30. If desired, intermediate support member 48 can confront the plane of the sleeping surface 30 at a level slightly below the plane of the sleeping surface 30.

FIG. 15B shows a guard frame portion 142 having the upper support member or cross tube 44, the lower support member or cross tube 46, and an intermediate support member or cross tube 144. Intermediate support member 144 confronts the plane of the sleeping surface 30 and is positioned slightly below the plane of the sleeping surface 30. The axis of intermediate support member 144 may be disposed at a predetermined distance from the axis of lower support member 46 and such predetermined distance is preferably between about six and 10 inches, more preferably between about seven and nine inches, and most preferably about eight inches. Intermediate support member 144 confronts the side 32 of the mattress 24.

In FIGS. 14A and 14B, it should be noted that sheeting or wall 50 is engaged between the intermediate support members 132 and 134 (in FIG. 14A) and the intermediate support members 138 and 140 (in FIG. 14B), as well as between the other support members. Sheeting or wall 50 can also envelope such support members.

It should be noted that all support members 132, 134, 138, 140, 48, and 144 are adjustable in height by manipulating a connection with the side support members 40, 42. Specifically, it should be noted that intermediate support members 134, 138, 140, 48 and 144 are strategically adjustable to and away from lower support member 46. Specifically, it should be noted that intermediate support members 132, 134, upper intermediate support member 138, upper support member 48, and upper support member 144, are strategically adjustable to and away from the plane of the sleeping surface 30 and to and away from a confronting relationship with the sleeping surface 30. As to such height adjustments, the Flannery et al. U.S. patent application Ser. No. 10/820,358 filed Apr. 7, 2004 and entitled Mattress Hugging Bed Rail is hereby incorporated by reference in its entirety.

Figure 16A:
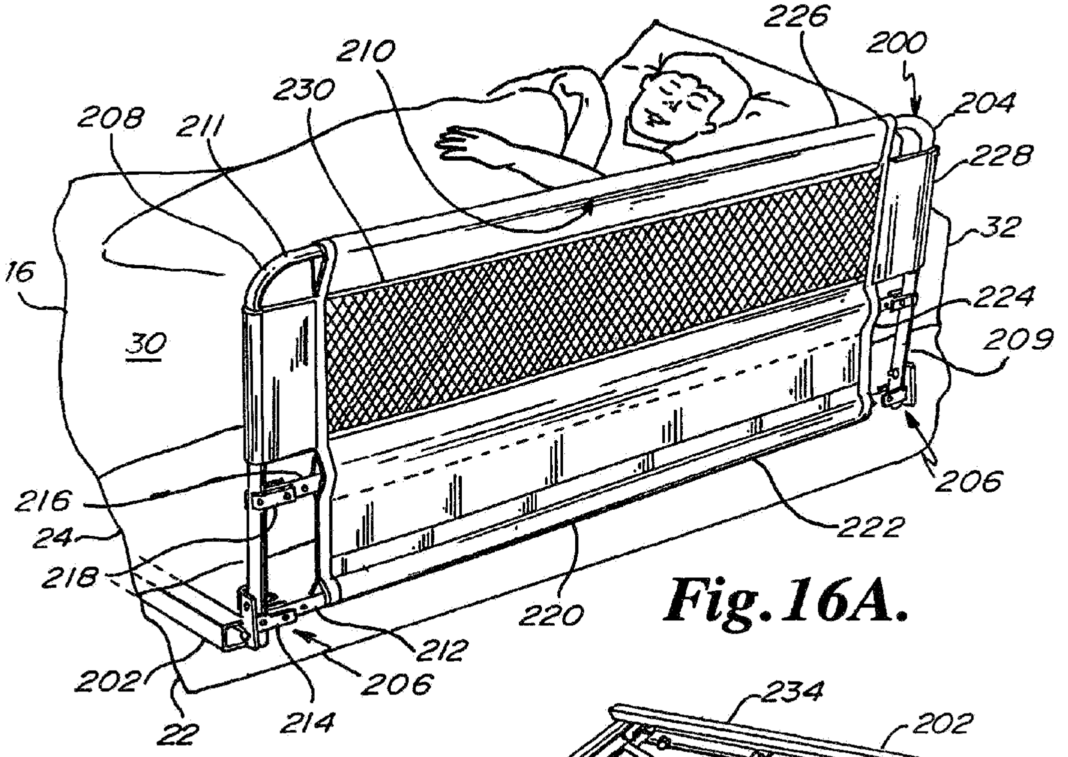
FIG. 16A is a perspective view of an alternate embodiment of the present bed rail with the base frame portion engaged between the box spring and mattress of a bed and with the guard frame portion in the upright, locked and operating position at a first side of the bed.

Another embodiment of the present bed rail is shown in FIGS. 16A, 16B, 17A, 17B, 18A, 18B, 18C, 19A, 19B and 21B and is indicated by reference numeral 200. Bed rail 200 includes a base frame portion 202 and a guard frame portion 204. As with bed rail 10, base frame portion 202 is engaged between a box spring 22 and mattress 24, or underneath a mattress or sleep structure 24 without a box spring, such that the guard frame portion 204 confronts or hugs the first side 32 of the bed 16. It should be noted that FIG. 16A shows the box spring 22 and mattress 24 slightly cut away so as to expose a length of the base frame portion 202. In fact, very little of the base frame portion 202 projects beyond the first side 32 of the bed. Preferably such projection is less than about one inch, more preferably less than about one-half inch, and most preferably less than one-third of an inch.

Guard frame portion 204 can be generally disposed in a first plane at the side of the bed and in a second plane between the box spring 22 and mattress 24. Base frame portion is generally disposed in the second plane between the box spring 22 and mattress 24. The guard frame portion 204 extends from below the sleeping surface 30 to above the sleeping surface 30 when the bed rail 200 is in the operating position. The guard frame portion 204 is disposed generally between the two sides of the bed when the bed rail 200 is in the stored position. It should be noted that the guard frame portion 204 can also be in the second plane after having been slid almost completely out of the base frame portion 202, and at such a location or prior to such a location, can be pivoted upwardly toward the operating position.

FIG. 16A further shows that the guard frame portion 204 is engaged to the base frame portion 202 via a pair of connections or corner connections or two point or two location connections 206. Via such connections 206, the guard frame portion 204 can pivot via base frame portion 202, can further slide via base frame portion 202, and can be fixed firmly in the operating position via the base frame portion 202. Connection 206 is described in detail below with reference to FIGS. 17B, 18A, 18B, 18C, 19A and 19B.

FIG. 16A further shows that the guard frame portion 204 includes an inverted U-shaped support member 208. U-shaped member 208 runs from one of the connections 206, up the side 32 of the bed 16, beyond the sleeping surface 30 of the bed 16, across the sleeping surface at the side 32 of the bed 16, then down the side 32 of the bed 16, and to the other of the connections 206. U-shaped member 208 is preferably formed of two generally L-shaped member sections that are engaged with each other at a center connection or region 210, where the member sections engage each other with a male/female connection and where the connection may be a quick connect engagement such as with button spring connections. The U-shaped member 208 includes side member sections 209 and upper member sections 211. U-shaped member 208 is disposed in the first plane and at about a 90 degree angle relative to base frame portion 202, or more preferably between about 85 degrees and about 89 degrees relative to base frame portion 202.

Guard frame portion 202 further includes a generally linear lower support member 212 removably engaged between the corner connections 206. A cradle 214 is rigidly affixed to each of the ends of U-shaped member 208 and ends of the lower support member 212 are engaged in the cradles 214 via quick connects such as button springs. Lower support member 212 includes a pair of member sections that are joined via a male/female connection, which can include a quick connect that includes button springs.

Guard frame portion 202 further includes an intermediate support member 216 disposed between the lower support member 212 and the upper member sections 211 of the U-shaped member 208. Intermediate support member 216 is removably engaged to side member sections 209 via cradles 218. End portions of the intermediate support member 216 have button springs that can engage openings in the cradle 218. Intermediate support member 216 can include a pair of member sections that are joined via a male/female connection, which can include a quick connect that includes button springs.

Lower support member 212, intermediate support member 216 and upper member sections 211 are generally parallel to each other and are generally of the same length. Lower support member 212 and intermediate support member 216 are removably engaged to the side member sections 209 of U-shaped support member 208. Upper member sections 211 are disposed above the plane of the sleeping surface 30. Intermediate support member 216 is disposed slightly below and confronts the plane of the sleeping surface 30. Intermediate support member 216 runs generally parallel to the plane of the sleeping surface 30. Lower support member 212, intermediate support member 216 and upper member sections 211 run generally at a right angle relative to side member sections 209. U-shaped support member 208, lower support member 212, and intermediate support member 216 are disposed generally in a common plane.

Guard frame portion 204 includes sheeting 220. Sheeting 220 is engaged by the lower support member 212, intermediate support member 216, side member sections 209 and upper member sections 211. Sheeting 220 includes three through openings 222, 224, and 226 for engaging lower support member 212, intermediate support member 216 and upper member sections 211, respectively. Sheeting 220 further includes a pair of through openings 228 for engaging the side member sections 209. Via the through openings 222, 224, 226 and 228, via lower support member 212 and intermediate support member 216 being removably engaged to the U-shaped support member 208, and via the upper member sections 211 being disengagable relative to each other, the sheeting 220 is removable from the guard frame portion 204 for being washed or replaced. Sheeting 220 includes a rectangular mesh section 230 disposed between the intermediate support member 216 and the upper member sections 211. Sheeting 220 is fixed relatively tightly or tautly on guard frame portion 204.

Figure 16B:
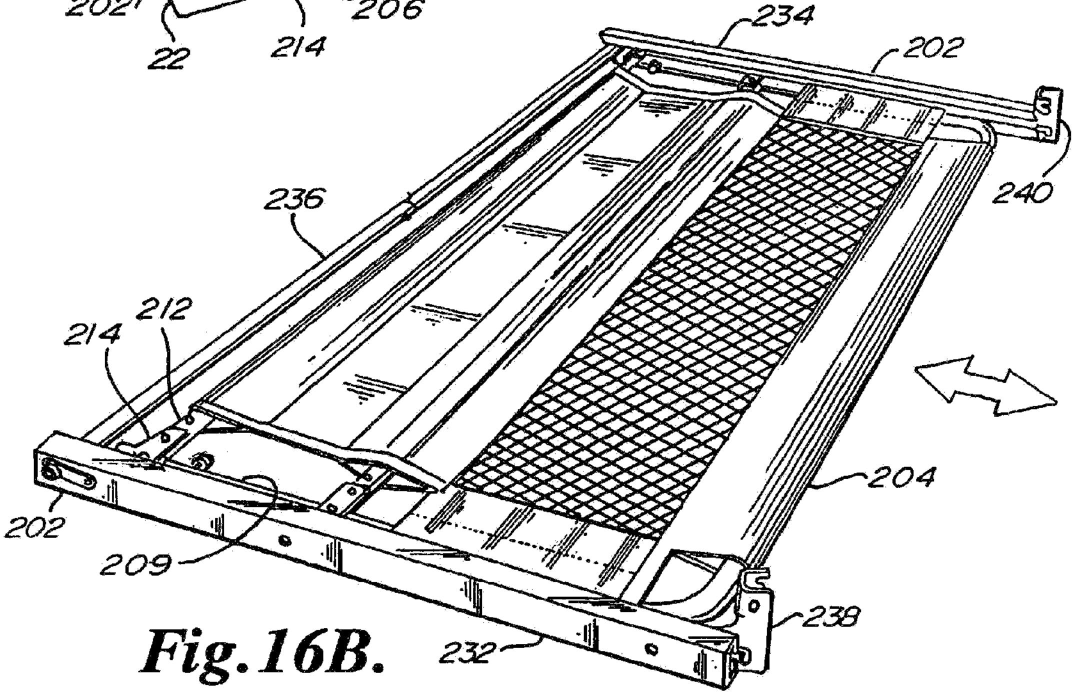
FIG. 16B is a perspective view of the bed rail of FIG. 16A, with the guard rail portion in a stored position within the base frame portion.

FIG. 16B shows the stored compact position of the bed rail 200. In this position, each of the guard frame portion 204 and base frame portion 202 are generally completely disposed between the box spring 22 and the mattress 24. In such position, the guard frame portion 204 lies in a common plane with the base frame portion 202. In such position, each of the guard frame portion 204 and base frame portion 202 are generally disposed between the two sides of the bed with the exception of the counter members 238, 240 and 342 that engage the sides of the bed.

Figure 17A:
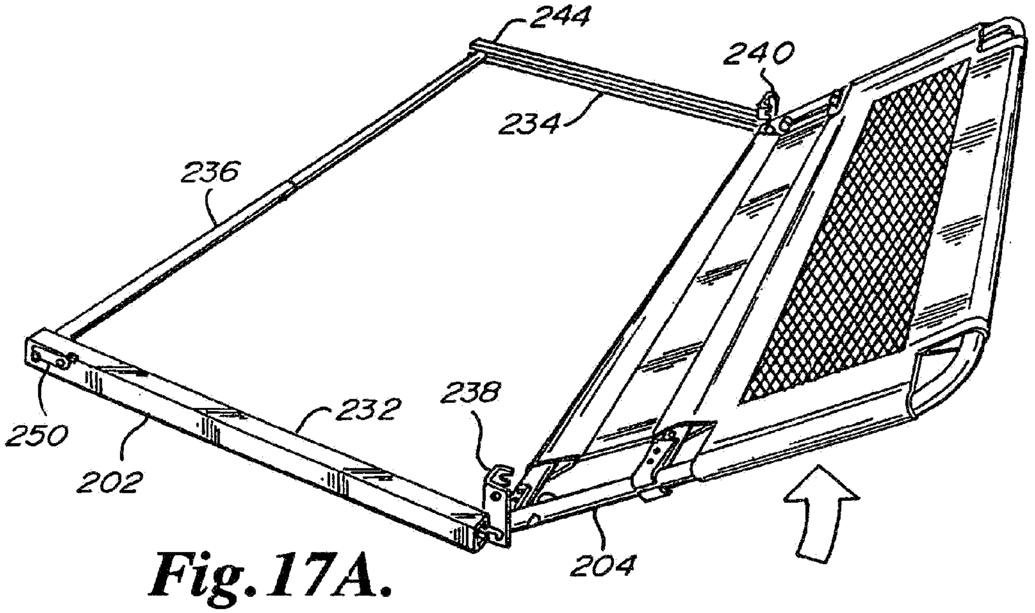
FIG. 17A is a perspective view of the bed rail of FIG. 16A, showing the guard frame portion in the process of being swung up to the upright, locked and operating position.

As shown in FIGS. 16B and 17A, base frame portion 202 generally includes a pair of side rails or tracks 232, 234, a cross support 236 and a pair of guard support receptors or counter members 238, 240. Each of the side rails 232, 234 includes a proximal end portion 242 and a distal end portion 244. The cross support 236, formed of two removably engaged pieces, is removably engaged between the distal end portions 244 of the side rails 232, 234. Each of the guard support receptors 238, 240 is integrally and rigidly formed with its respective side rail 232, 234 at the proximal end portion 242. Guard support receptors 238, 240, rigidly affixed to the base frame portion 202, are counter members that oppose counter members 342 (shown in FIG. 21B) such that the bed rail 200 or base frame portion 202 continually hugs the bed, regardless of whether the guard frame portion 204 is in the operating position or the stored position and such that the base frame portion 202 provides a firm base for the guard frame portion 204 in the operating position.

FIG. 17A shows the guard frame portion 204 in the process of being swung, namely pivoted (after having been slid from the stored, compact and planar position of FIG. 16B) to the operating and upright position of FIG. 16A. After having been slid out of the base frame portion 202 and after having been swung fully upright, the guard frame portion 204 engages the guard support receptors 238, 240.

FIGS. 17B, 18A, 18B, 18C, 19A and 19B show in detail a two point connection or two location connection 245 between the base frame portion 202 and guard frame portion 204 that provides for sliding and swinging of the portions 202, 204 relative to each other and that also provides for a stable operating position of the guard frame portion 204. Each of the rails or tracks 232, 234 is generally a tube square in section. Each of the rails or tracks 232 includes a slot 246 formed in the inner side 248 of the tubular rail 232, 234. The slot 246 extends longitudinally relative to rails 232, 234 and extends from proximal end portion 242 to the distal end portion 244. Slot 246 is closed off at the proximal end portion 242. Slot 246 is closed off at the distal end portion 244 by the cross member 236. Cross member 236 is removably engaged at the distal end portions 244 via a pivoting lock 250 having one end pivotally joined to its respective side rail 232 or 234 and having another end cooperating with a slot formed in cross member 236 so as to fix the cross member 236 relative to the distal end portion 244, as shown in FIG. 17A.

Figure 19A:
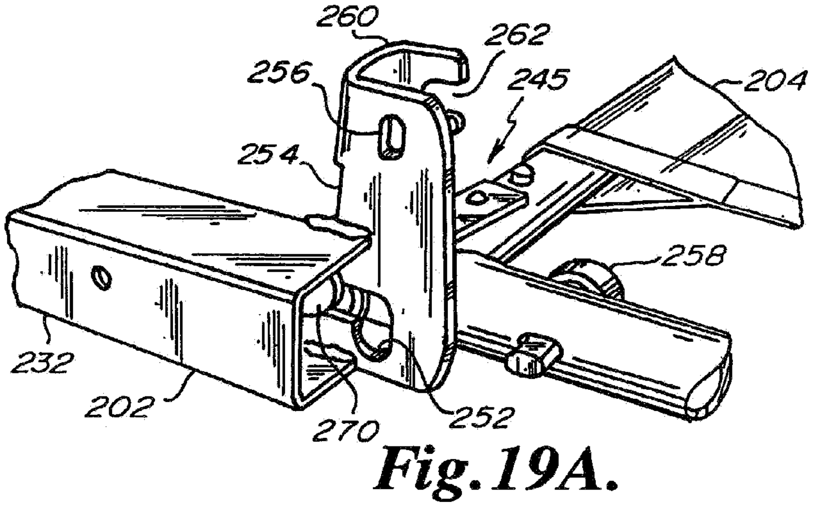
FIG. 19A is a detail perspective view of the two point or two location connection of FIG. 17B while the guard frame portion is being slid into the base frame portion.

As shown in FIG. 19A, each of the rails 232, 234 includes a seat or point of connection or connection 252 that is co-extensive with slot 246. Like slot 246, seat 252 is formed in the inner side 248 of each of the rails 232, 234. Slot 246 may be referred to as a horizontally extending slot. Seat 252 may be referred to as a vertically extending slot. Seat 252 is offset from slot 246. Seat 252 extends downwardly from slot 246.

Each of the guard support receptors 238, 240 is integrally formed with proximal end portion 242 of its respective rail 232 or 234. Each of the guard support receptors 238, 240 includes a plate section 254 coplanar with the inner side 248 of its respective rail 232 or 234. Plate section 254 extends from the bottom edge of its respective tube 232 or 234 to and beyond the upper edge of its respective tube 232 or 234 and includes a height generally about twice that of the height of tubes 232, 234. Plate section 254 further extends beyond proximal end 242 so as to extend forwardly of proximal end portion 242 such that a portion of seat 252 is formed in its respective rail 232, 234 and another portion of seat 252 is formed in plate section 254, as shown in FIG. 19A. The portion of plate section 254 extending forwardly of the proximal end portion 242 also projects beyond the side 32 of the mattress 24 and the side 32 of the box spring 22. The terminal end of proximal end portion 242 is preferably coplanar with or tucked slightly inwardly of the side 32 of the mattress 24 and the side 32 of the box spring 22. An upper end portion of plate section 254 includes a through hole 256 for reception of a pin connector 258.

Pin connector 258 and its cooperating structure such as slot 262, opening 256 and U-shaped receptor 260 can be referred to as a point of connection or a connection. Seat 252 and rider 290 and its pin is also a point of connection or a connection.

Each of the guard support receptors 238, 240 further includes the U-shaped receptor portion 260 integral with plate section 254 and extending from an upper end portion of the plate section 254. U-shaped receptor portion 260 extends inwardly from the upper end portion of the plate section 254 and includes an open ended slot 262 for receiving pin connector 258. U-shaped receptor portion 260 receives, cradles, supports and locks therein side member section 209 of the U-shaped support member 208.

Connection 245 further includes pin connector 258 engaged in openings diametrically opposite of each other in side member section 209. Pin connector 258 includes a handle or finger handle or proximal portion 264 and a distal end 266 that engages hole 256. The proximal portion 264 is greater in width than the width of slot 262. Pin connector 258 further includes a coil spring 268 mounted within side member section 209 and biasing pin connector 258 in a direction toward hole 256 such that pin connector 258 is biased toward a locked position.

Figure 19B:
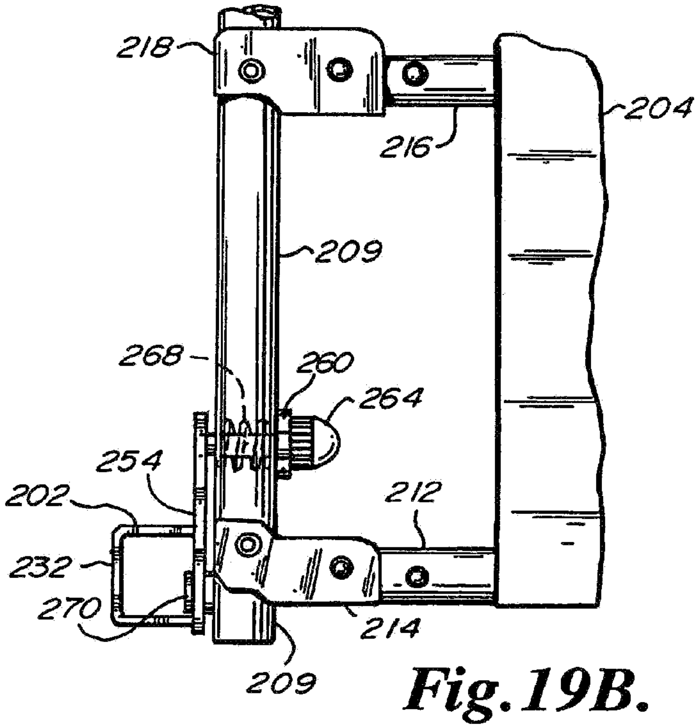
FIG. 19B is a detail front view of the two point connection of FIG. 17B while the guard frame portion is in the upright, locked and operating position.

Connection 245 further includes a rider or pin connector 270, shown in FIG. 19B. Rider 270 includes two disks interconnected by a pin, with the pin being engaged with a proximal end portion of side member section 209. The portion of the pin between the two disks rides in slot 246 and may ride on edge 272 of the slot 246. One of the disks, preferably a washer, of connector 270 rides outside of its respective rail 232 or 234. The other of the disks of connector 270 rides inside of its respective rail 232 or 234. The diameter of each of the disks is greater than the width of slot 246 such that connector 270 remains engaged with its respective rail 232 or 234. It should be noted that rider or pin connector 270 can be in the nature of a wheel, with the wheel being rotatably affixed via such pin to the proximal end portion of the side member section 209. Or the rider 270 can be rigidly fixed to the proximal end portion of the side member section 209, with the disk adjacent to the side member section 209 being, for example, welded to side member 209 or running free relative to side member 209 where such piece is a washer. As well as riding in slot 246, rider or connector 270 is seatable in seat 252. When the guard frame portion 204 is fixed in the upright and operating position, rider 270 is seated in seat 252.

With reference to the following figures in the order denoted below, operation of the bed rail is explained.

In FIG. 16B, the guard frame portion 204 has been fully slid into the base frame portion 202. In this position, the proximal or bottom end portions of the side member sections 209 confront the cross member 236. In this position, the rider 270 is engaged in the slot 246. In this position, the upper member sections 211 are disposed inwardly of the side 32 of the bed 16 such that the guard frame portion 204 is generally out-of-sight. In this position, the base frame portion 202 can be engaged to the second or far side of the box spring 22 and/or the second or far side of the mattress 24 via a strap 76 and counter member 78 as shown in FIG. 2A via the counter member and strap apparatus 330 of FIG. 21B. To slide the guard frame portion 204 out of the base frame portion 202, the guard frame portion 204 is grasped at or near the central region 210 such that the upper member sections 211 are grasped and the guard frame portion 204 is slid out from between the mattress 24 and box spring 22.

FIG. 19A shows the guard frame portion 204 almost fully slid to the end of the base frame portion 202. Rider 270 is about to engage the seat 252. When the rider 270 reaches the seat 252, the rider 270 drops down into the seat 252 and the user manipulating the guard frame portion 204 can feel such a drop. It should be noted that, in this position shown in FIG. 19A, the guard frame portion 204 is both slideable and pivotable relative to the base frame portion 202.

Figure 18A:
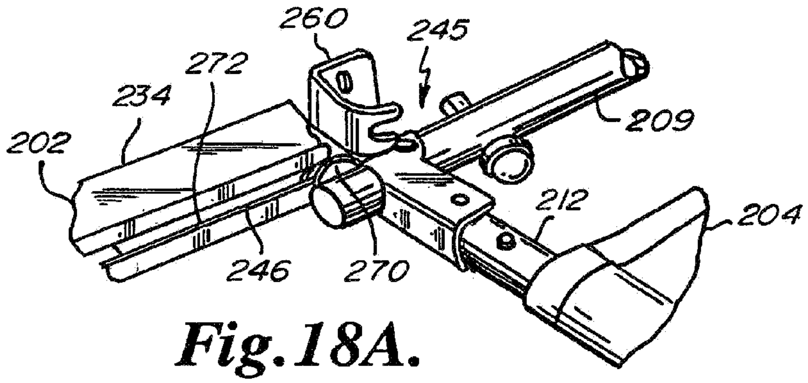
FIG. 18A is a detail perspective view of the connection of FIG. 17B after the guard frame portion has been fully slid out of the base frame portion.

FIG. 18A shows the rider 270 in the seat 252 and out of the slot 246. At this point, the guard frame portion 204 is pivotable relative to the base frame portion 202 but not slideable relative to the base frame portion 202. Again, it should be noted that even before reaching the point of dropping into seat 252, the guard frame portion 204 is pivotable relative to the base frame portion 202, limited only by the compressability of the mattress 24 and box spring 22 and the height of the U-shaped receptor portion 260.

Figure 18B:
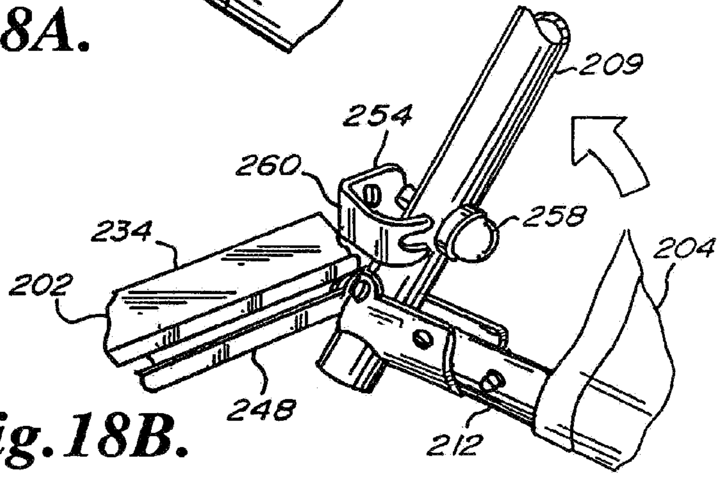
FIG. 18B is a detail perspective view of the two point or two location connection of FIG. 17B while the guard frame portion is in the process of being swung up to the upright, locked and operating position.

FIG. 18B shows the guard frame portion 204 pivoting relative to the base frame portion 202. In this position, rider 270 is in the seat 252. In this position, the user can retract or start to retract connector pin 258. If not retracted, the distal end 266 of the connector pin 258 will hit the edge of plate section 254. In this position, the distal end 266 of pin connector 258 begins to approach hole 256 and the proximal end portion of the shaft of the pin connector 258 begins to approach slot 262.

Figure 17B:
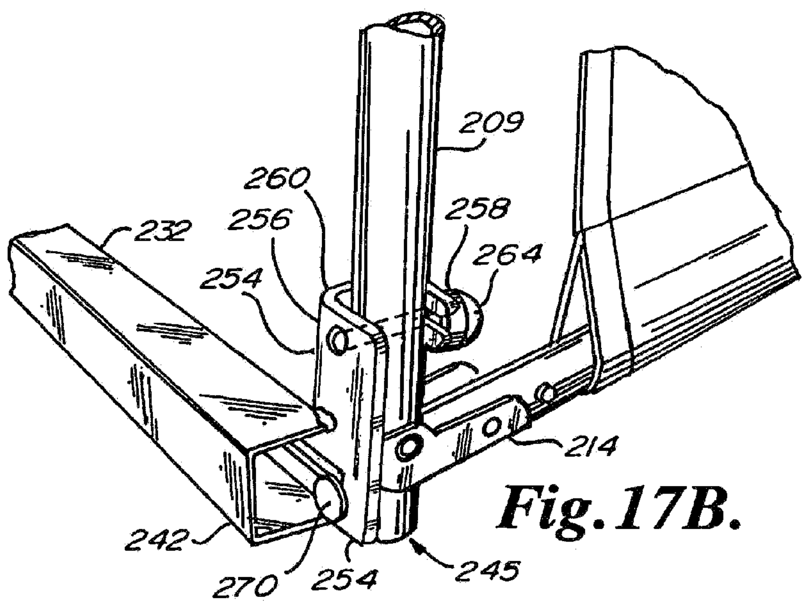
FIG. 17B is a detail perspective view of a two point or two location connection between the guard frame portion and the base frame portion when the guard frame portion is in the upright, locked and operating position of FIG. 16A.
Figure 18C:
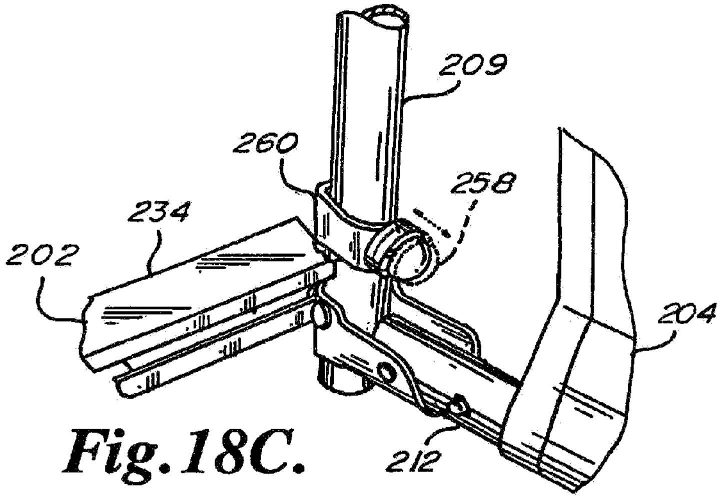
FIG. 18C is a detail perspective view of the two point or two location connection of FIG. 17B when the guard frame portion is in the upright, locked and operating position.

In FIG. 18C, the guard frame portion 204 has been fully swung up to the upright, operating, and locked position where rider 270 is in the seat 252, where the distal end 266 of the connector pin or lock 258 is engaged in hole 256, and where the side member section 209 is engaged in the U-shaped receptor portion 260. In such position, each of the connections or locks 245 is locked. FIG. 17B and FIG. 19B show the same fully swung up, upright, operating and locked position between guard frame portion 204 and base frame portion 202.

To bring the guard frame portion 204 down from the upright, operating and locked position, the operation is reversed. Each of the pin connectors or locks 258 is pulled out and the guard frame portion 204 is swung down. Then the guard frame portion 204 is slightly lifted up to lift riders 270 out of their respective seats 252 and into their respective slots 246. Then the guard frame portion 204 is slid into base frame portion 202 with the riders 270 sliding in their respective slots 246 until the proximal or lower end portions of the side member sections 209 confront the cross member 236 whereupon the guard frame portion 204 attains its stored, flat, compact and coplanar position with base frame portion 202.

Figure 20:
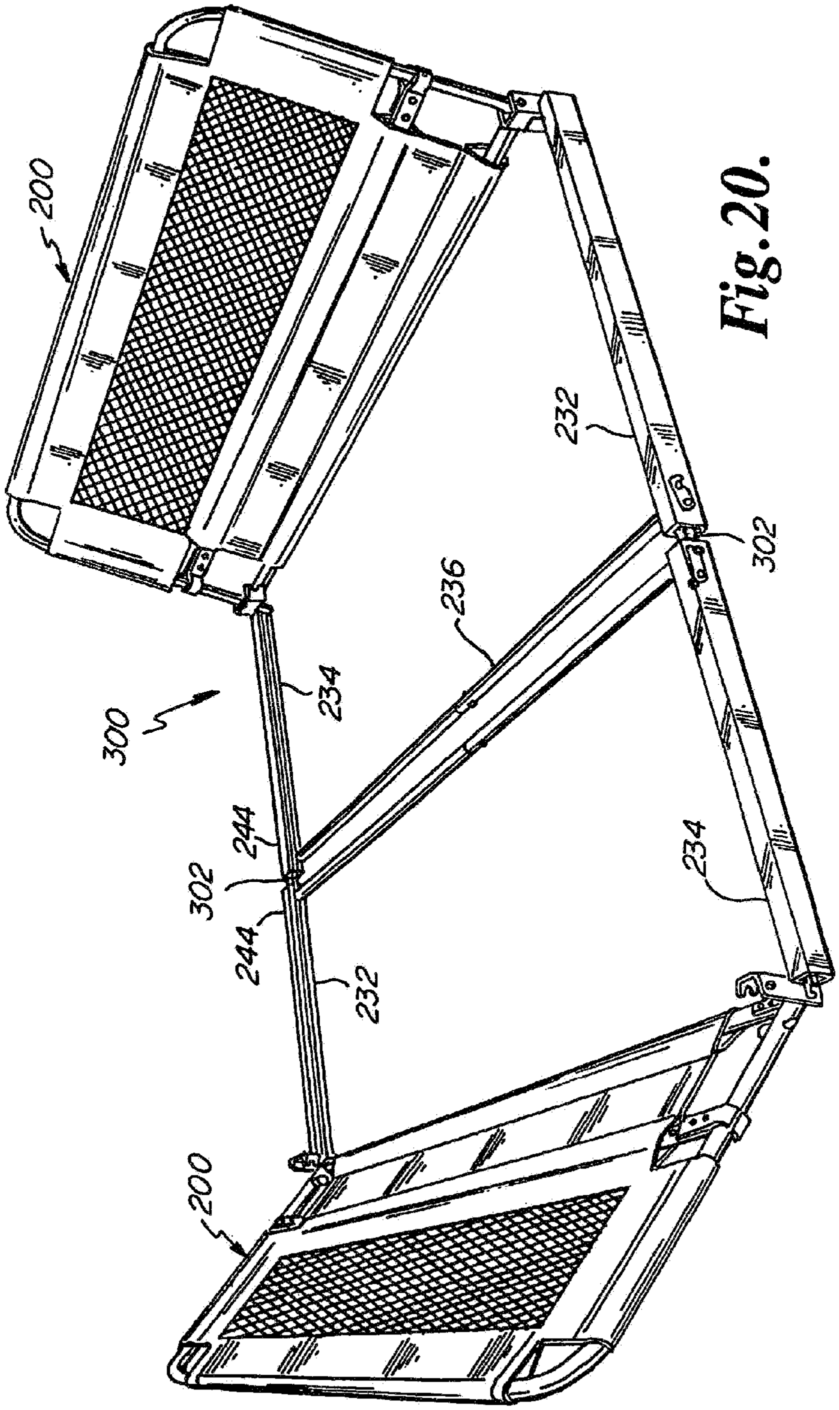
FIG. 20 is a perspective view of an alternate embodiment of the invention, where two bed rails of FIG. 16A are set back to back and interconnected so as to guard both sides of the bed.

FIG. 20 shows another embodiment of the present invention where reference number 300 indicates two bed rails 200 placed back to back so as to guard and confront the two opposite sides of a bed. A plug 302 may be inserted in two confronting open ended distal end portions 244 of the rails 232, 234 to tie the bed rails 200 back to back. Plug 302 may include a pair of holes through which ends of the cross member 236 are inserted. A method of tying two bed rails 200 back to back may include the steps of unlocking the cross members 236 by operating locks 250, removing the cross members 236 from the rails 232, 234, inserting one plug between one rail 232 and its confronting rail 234, inserting the second plug between the other rail 232 and its confronting rail 234, inserting the cross members 236 back into aligned holes formed in the plugs 302 and rails 232, 234, and locking the locks 250. It should be noted that each of the plugs 302 may be elongate and have a number of linearly arranged holes such that the bed rails 200 can be set any one of a number of distances from each other. Such two bed rails 200 act as counter members for each other, even when one bed rail 200 is in the upright and operating position and one bed rail 200 is tucked away in the compact and stored position because of the operation of the guard support receptors 238 and 240 as counter members. Specifically, the upright plate section 254 of the guard support receptors 238, 240 confront the sides of the bed. Guard support receptors 238, 240 as a whole of one bed rail 200 are counters to the guard support receptors 238 and 240 of the bed rail 200 on the other side of the bed.

Figure 21A:
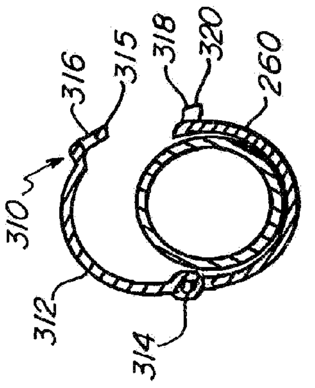
FIG. 21A shows a section view of an alternate embodiment of one of the two point or two location connections shown in FIG. 17B, where the alternate connection replaces the pin of FIG. 17B.

FIG. 21A shows a section view of an alternate connection 310. Alternate connection or lock 310 replaces the pin connector 258 of FIG. 17B. Alternate connection 310 includes the U-shaped receptor portion 260 where portion 260 is more rounded than the U-shaped receptor portion 260 of FIG. 17B so as to form a portion of a circle. A semi-circular plate 312 is hinged to portion 260 via a hinge 314 at one end. At its other end 315, semi-circular plate 312 includes an opening 316. Opening 316 receives a depressable button 318 on U-shaped portion 260. When end 315 hits the slanted surface 320 of button 318, button 318 is pushed into portion 260. Then button 318 snaps out and into opening 316, thus locking the semi-circular plate 312 about side member tube 209 and thus locking the guard frame portion 204 to the base frame portion 202 in the first plane. Connection or lock 310 is unlocked by pushing on button 318 and then pivoting the semi-circular plate 312 outwardly, permitting the guard frame portion 204 to pivot and swing outwardly relative to the base frame portion 202.

Figure 21B:
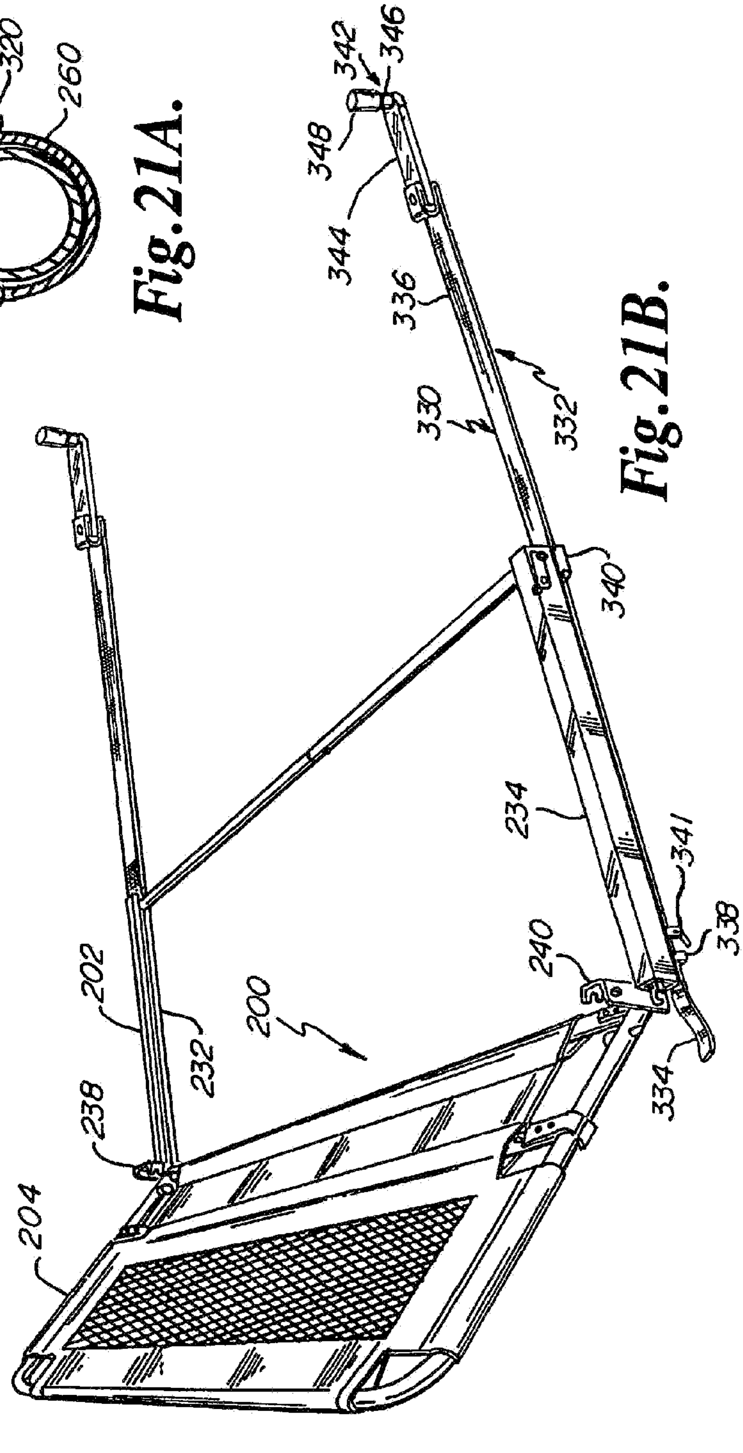
FIG. 21B shows a strap and counter member engaged to the bed rail of FIG. 16A.

FIG. 21B shows a counter member and strap apparatus 330. Apparatus 330 includes a strap 332 having a proximal end 334 and a distal end 336. Strap 332 is fed through a distal loop 340 engaged to the underside of each of the side rails 232 and 234 and is further fed through a proximal loop 338 affixed to the underside of each of the side rails 232 and 234. Such loops 338 and 340 are rigid loops, such as formed from metal. Loops 338, 340 having an opening running in the lateral direction of the bed and running in the axial direction of the side rails 232, 234. Strap 332 is further fed through a lock or buckle 341 that confronts the proximal loop 338 such that the effective length of a counter member 342 is adjustable. Lock or buckle 341 is engaged to the underside of each of the side rails 232, 234. Strap 332 is a flexible strap formed from a material such as nylon.

Apparatus 330 further includes the counter member 342 engaged to the distal end 336 of the strap 332. Counter member 342 is a rigid angled piece having a first portion 344 generally in line with the strap 332 and a second portion 346 disposed at generally a right angle relative to first portion 344. A plastic or elastomer or rubber cap 348 engages an upper section of second portion 346.

In operation, strap 332 having counter member 342 is first fed through distal loop 340 and is then fed through lock 341 and proximal loop 338. Then, bed rail 200 is engaged to the bed by inserting the rail 200 in its flat form under the bed, placing the counter members 342 on the second side of the bed with the second portions 346 turned upwardly, drawing or sliding out the guard frame portion 204, pivoting the guard frame portion 204 up to its locked and operating position such that the guard frame portion 204 acts as a second counter member (along with first or primary counter members 238, 240) and opposes the counter members 342 when strap 332 is tightened and locked, and then by actually drawing out strap 332 so as to draw counter member 342 against the second side of the bed and so as to draw the guard frame portion 204 and guard support receptors or counter members 238, 240 against the first side of the bed and then operating buckle 341 to lock the strap 332 in place such that the counter members 342 and counter members or guard support receptors 238 and 240 (along with guard frame portion 204) hug the bed therebetween. It should be noted that the above operation can also be performed with the guard frame portion 204 in the flat form because guard support receptors or counter members 238, 240 (specifically plate section 254) act as counter members on the first side of the bed, which counter members 238, 240 oppose and work against their respective counter members 342 such that the bed is hugged therebetween when the guard frame portion 204 is in both the stored flat out of the way position and operating position.

It can be appreciated that the buckle or lock 341 and loose or proximal end 334 of the strap 332 are disposed so as to confront the first side of the bed. This is convenient for the caregiver to set up bed rail 200, to loosen and tighten the bed rail 200 such as when sheets are being changed, and to take the bed rail 200 off the bed.

It should be noted that loops 340 and 338 confront the respective ends of the track or rails 232, 234 so as to maximize support in the longitudinal direction for the bed rail 200. It should further be noted that strap 332 extends colinearly with its respective track or rail 232, 234 and with counter member 342.

Instead of the counter member and strap apparatus 330, it should be noted that other types of apparatus may be used. For example, rigid members or telescoping members or other members adjustable in length in the lateral direction of the bed may be substituted for the straps.

It should be noted that the bed rail embodiments 10, 200 and 300 are not limited to mattress and box spring types of beds. Counter members 238, 240 are disposed on the first side of the sleeping structure and counter members 342 engaged the other side of the sleeping structure and hug the sleeping structure therebetween.

The term engagement or connection includes the term lock. It should be noted that the term lock when used herein means a structure that firmly holds. The term lock does not require a key. The term lock can include a structure or engagement or connection that requires a manual manipulation to engage and/or disengage.

It should be noted that bed rail 10 includes a two point connection arrangement and the bed rail 200 includes a two point connection arrangement.

As to bed rail 200, it should be noted that the upper point of connection may also be a seat or vertically extending slot for a pin and, in such a case, the guard frame portion can be lifted up slightly and then brought down into the upper and lower seats and/or slots at the same time to fix the guard frame portion in the operating position. In this latter case, the slots or seats minimize lateral movement of the guard frame portion and thus maintain the guard frame portion rigidly and sturdily in the first plane. For example, a two point connection may include the upper point of connection of bed rail 10 and the lower point of connection of bed rail 200.

In the present case, a connection can be a restriction against movement in at least one direction, such as a restriction against movement in a lateral direction and/or a restriction against movement in a depth direction and/or a restriction against movement in a longitudinal direction and/or a restriction against movement in a swinging direction, and thus in this sense a seat or a slot is a connection or fixed connection.

The base frame 202 includes a cross support 236 engaged between distal end portions 244 of the first and second tracks 232, 234. The guard frame 204 includes a first edge 211. The first edge 211 is a top edge when the guard frame 204 is in the operating position. The first edge 211 is an outside edge when the guard frame 204 is in the stored position. The distal end portions 244 of the first and second tracks 232, 234 are distal of the guard frame 204 when the guard frame 204 is in the operating position. The distal end portions 244 of the first and second tracks 232, 234 are distal of the first edge 211 when the guard frame 204 is in the stored position.

The guard frame 204, the base frame 202, the first track 232 and the tube of the first track 232, the second track 234 and the tube of the second track 234, the first rider 270, the second rider, and the cross support 236 form a one-piece unit that can be engaged to the bed 16 as said one-piece unit and that can be taken off the bed 16 as said one-piece unit.

As shown in FIGS. 18A, 18B, 18C, 19A and 19B, track 232 includes a tube having an interior and a longitudinal slot 246, with the rider 270 extending laterally through the longitudinal slot to ride in the interior of the tube of the track 232.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A bed rail, the bed rail having a guard frame engaged to a base frame, the base frame being removably tucked below a sleeping surface of a bed and between the first and second sides of the bed, the bed having a mattress and mattress support and the base frame being between the mattress and mattress support, the guard frame including an upper support member, a lower support member, a first side support member, a second side support member, and sheeting, the upper and lower support members being between the first and second side support members, the first and second side support members having lowermost ends, the lower support member of the guard frame having ends adjacent to said lowermost ends, the bed rail comprising:

a) means for taking down the bed rail from one of the sides of the bed comprising:

i) connection means for connecting the guard frame to the base frame, where the connection means disengages from an operating position at said side of the bed the guard frame from the base frame, ii) means for pivoting the guard frame relative to the base frame, and iii) means for sliding the guard frame into and out of the base frame such that 1) in a stored position the guard frame is in the base frame and 2) in the stored position each of the guard frame and base frame is between the mattress and mattress support; and b) means for setting up the bed rail comprising:

i) said means for sliding the guard frame into and out of the base frame, ii) said means for pivoting the guard frame relative to the base frame, and iii) said connection means for connecting the guard frame to the base frame, where the connection means engages the guard frame to the base frame such that the guard frame is fixed relative to the base frame and fixed in the operating position at the side of the bed.

* * * * *